United States Patent
Xu

(10) Patent No.: US 10,901,087 B2
(45) Date of Patent: Jan. 26, 2021

(54) TIME OF FLIGHT CAMERA

(71) Applicant: Microsoft Technology Licensing, LLC, Redmond, WA (US)

(72) Inventor: Zhanping Xu, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 428 days.

(21) Appl. No.: 15/871,291

(22) Filed: Jan. 15, 2018

(65) Prior Publication Data

US 2019/0219696 A1    Jul. 18, 2019

(51) Int. Cl.

| | | |
|---|---|---|
| *G01S 17/36* | (2006.01) | |
| *G01S 7/4915* | (2020.01) | |
| *G01S 7/481* | (2006.01) | |
| *G01S 7/493* | (2006.01) | |
| *G01S 7/4911* | (2020.01) | |
| *G01S 17/89* | (2020.01) | |

(52) U.S. Cl.
CPC ............ *G01S 17/36* (2013.01); *G01S 7/4814* (2013.01); *G01S 7/493* (2013.01); *G01S 7/4911* (2013.01); *G01S 7/4915* (2013.01); *G01S 17/89* (2013.01); *G01S 7/4815* (2013.01)

(58) Field of Classification Search
None
See application file for complete search history.

(56) References Cited

U.S. PATENT DOCUMENTS

| | | |
|---|---|---|
| 3,704,465 A | 11/1972 | Masak et al. |
| 4,864,395 A | 9/1989 | Tajima |
| 5,579,107 A | 11/1996 | Wright et al. |
| 5,581,345 A | 12/1996 | Oki et al. |

(Continued)

FOREIGN PATENT DOCUMENTS

| | | |
|---|---|---|
| EP | 2116864 A1 | 11/2009 |
| EP | 2157401 A1 | 2/2010 |

(Continued)

OTHER PUBLICATIONS

"International Search Report and Written Opinion Issued in PCT Application No. PCT/US18/59553", dated Feb. 12, 2019, 13 Pages.

(Continued)

*Primary Examiner* — Isam A Alsomiri
*Assistant Examiner* — Amir J Askarian

(57) ABSTRACT

A method of determining distances to features in a scene comprising transmitting structured light modulated at a modulation frequency to illuminate the scene with a structured illumination pattern and for each combination of a sampling phase offset $\psi_k$ and a perturbation phase shift $\lambda_n$, modulating sensitivity of a photo sensor at the frequency of modulation of the transmitted light, but phase shifted relative to phase of the transmitted light by a phase $\theta_{k,n}=(\psi_k+\lambda_n)$, and for each value of $\theta_{k,n}$ modulo 360°, registering light reflected by features in the scene during a different exposure and using the registered light to provide a range image of the scene.

20 Claims, 3 Drawing Sheets

(56) References Cited

U.S. PATENT DOCUMENTS

| | | |
|---|---|---|
| 6,323,942 B1 | 11/2001 | Bamji |
| 6,515,740 B2 | 2/2003 | Bamji et al. |
| 6,580,496 B2 | 6/2003 | Bamji et al. |
| 6,697,010 B1 | 2/2004 | Lam |
| 6,707,054 B2 | 3/2004 | Ray |
| 6,906,793 B2 | 6/2005 | Bamji et al. |
| 7,589,316 B2 | 9/2009 | Dunki-Jacobs |
| 7,719,662 B2 | 5/2010 | Bamji et al. |
| 8,363,927 B2 | 1/2013 | Rutschmann et al. |
| 8,587,771 B2 | 11/2013 | Xu et al. |
| 8,723,924 B2 * | 5/2014 | Mirbach ............... G01S 17/36 348/46 |
| 9,325,920 B2 | 4/2016 | Van Nieuwenhove et al. |
| 9,329,035 B2 | 5/2016 | Oggier |
| 9,405,008 B2 | 8/2016 | Raskar et al. |
| 9,435,891 B2 | 9/2016 | Oggier |
| 9,442,186 B2 | 9/2016 | Payne et al. |
| 9,482,514 B2 | 11/2016 | Bridges |
| 9,542,749 B2 | 1/2017 | Freedman et al. |
| 9,580,496 B2 | 2/2017 | Gearing |
| 9,753,128 B2 | 9/2017 | Schweizer et al. |
| 9,874,638 B2 | 1/2018 | Dorrington et al. |
| 9,989,630 B2 | 6/2018 | Gruenwald |
| 10,061,029 B2 * | 8/2018 | Waligorski ............ G01S 7/4914 |
| 10,215,856 B1 | 2/2019 | Xu |
| 10,401,498 B2 | 9/2019 | Oggier et al. |
| 10,605,916 B2 * | 3/2020 | Molnar ................. G01S 17/86 |
| 2002/0084430 A1 | 7/2002 | Bamji et al. |
| 2003/0076484 A1 | 4/2003 | Bamji et al. |
| 2003/0178549 A1 | 9/2003 | Ray |
| 2004/0213463 A1 | 10/2004 | Morrison |
| 2007/0127009 A1 | 6/2007 | Chen et al. |
| 2008/0068583 A1 | 3/2008 | Hiraide |
| 2008/0173803 A1 | 7/2008 | Dunki-jacobs |
| 2008/0180650 A1 | 7/2008 | Lamesch |
| 2009/0115995 A1 | 5/2009 | Bamji et al. |
| 2009/0237640 A1 | 9/2009 | Krikorian et al. |
| 2010/0296726 A1 | 11/2010 | Rutschmann et al. |
| 2011/0018967 A1 | 1/2011 | Mirbach et al. |
| 2012/0013887 A1 | 1/2012 | Xu et al. |
| 2012/0033045 A1 | 2/2012 | Schweizer et al. |
| 2013/0088726 A1 | 4/2013 | Goyal et al. |
| 2013/0148102 A1 | 6/2013 | Oggier |
| 2014/0049767 A1 | 2/2014 | Benedetti et al. |
| 2014/0055771 A1 | 2/2014 | Oggier |
| 2014/0170137 A1 | 6/2014 | Gearing |
| 2014/0267620 A1 | 9/2014 | Bridges |
| 2014/0313376 A1 | 10/2014 | Van Nieuwenhove et al. |
| 2014/0340569 A1 | 11/2014 | Raskar et al. |
| 2015/0056183 A9 | 2/2015 | Gearing |
| 2015/0193938 A1 | 7/2015 | Freedman et al. |
| 2015/0253429 A1 * | 9/2015 | Dorrington ............ G01S 7/493 356/5.01 |
| 2016/0005179 A1 | 1/2016 | Petyushko et al. |
| 2016/0109575 A1 | 4/2016 | Oggier et al. |
| 2016/0198147 A1 | 7/2016 | Waligorski et al. |
| 2016/0334509 A1 * | 11/2016 | Gruenwald ............. G01S 17/89 |
| 2017/0123067 A1 | 5/2017 | Van Der Tempel |
| 2017/0322309 A1 | 11/2017 | Godbaz et al. |
| 2018/0146186 A1 | 5/2018 | Akkaya et al. |
| 2018/0292516 A1 * | 10/2018 | Xu ......................... G01S 17/10 |
| 2019/0019302 A1 | 1/2019 | Akkaya et al. |
| 2019/0033448 A1 | 1/2019 | Molnar et al. |

FOREIGN PATENT DOCUMENTS

| | | |
|---|---|---|
| JP | H09269372 A | 10/1997 |
| JP | 2000517427 A | 12/2000 |
| JP | 2006214998 A | 8/2006 |
| JP | 2008164496 A | 7/2008 |
| JP | 2009063303 A | 3/2009 |
| WO | 2015133910 | 9/2015 |
| WO | 2016149438 | 9/2016 |
| WO | 2016171913 | 10/2016 |
| WO | 2017138032 A1 | 8/2017 |
| WO | 2018187106 A1 | 10/2018 |

OTHER PUBLICATIONS

"Final Office Action Issued in U.S. Appl. No. 15/480,823", dated Oct. 3, 2019, 14 Pages.

"Non Final Office Action Issued in U.S. Appl. No. 16/245,248", dated Jun. 27, 2019, 10 Pages.

"Office Action Issued in Korean Patent Application No. 10-2013-7001077", dated May 16, 2017, 4 Pages.

"Office Action Issued in European Patent Application No. 11807282.6", dated Jul. 24, 2014, 4 Pages.

"Office Action Issued in European Patent Application No. 11807282.6", dated Jan. 27, 2015, 4 Pages.

"Search Report Issued in European Patent Application No. 11807282.6", dated Apr. 17, 2013, 8 Pages.

"International Search Report and Written Opinion Issued in PCT Application No. PCT/US2011/42643", dated Dec. 22, 2011, 8 Pages.

"First Office Action and Search Report Issued in Chinese Patent Application No. 201110206379.8", dated Nov. 2, 2012, 9 Pages.

"Second Office Action Issued in Chinese Patent Application No. 201110206379.8", dated May 14, 2013, 8 Pages.

"Office Action Issued in Japanese Patent Application No. 2013-520728", dated Feb. 19, 2015, 7 Pages.

"International Search Report and Written Opinion Issued in PCT Application No. PCT/US2018/024700", dated Jul. 9, 2018, 14 Pages.

"Non Final Office Action Issued in U.S. Appl. No. 15/480,823", dated Apr. 19, 2019, 15 Pages.

"International Search Report and Written Opinion Issued in PCT Application No. PCT/US18/067773", dated Mar. 28, 2019, 16 Pages.

Dorrington, et al., "Separating true range measurements from multi-path and scattering interference in commercial range cameras", In Proceedings of the International Society for Optical Engineering, vol. 7864, Jan. 27, 2011, 10 Pages.

Bhandari, et al., "Resolving Multipath Interference in Kinect: An Inverse Problem Approach", In IEEE Sensors Journal, vol. 16, Issue 10, May 15, 2016, 4 pages.

Lefloch, et al., "Technical Foundation and Calibration Methods for Time-of-Flight Cameras", In Time-of-Flight and Depth Imaging. Sensors, Algorithms, and Applications, vol. 8200, Sep. 23, 2013, pp. 3-24.

Klein, Jonathan, "Correction of Multipath-Effects in Time-of-Flight Range Data", In Master's thesis of University of Siegen, Jan. 6, 2014, 95 Pages.

Xu, Zhanping; U.S. Appl. No. 15/480,823, filed Apr. 6, 2017.

Xu, Zhanping; U.S. Appl. No. 15/822,237, filed Nov. 27, 2017.

Bhandari, et al., "Resolving Multi-path Interference in Time-of-Flight Imaging via Modulation Frequency Diversity and Sparse Regularization", In Journal of Optics Letters, vol. 39, Issue 06, Apr. 2014, pp. 1-11.

"Notice of Allowance Issued in U.S. Appl. No. 15/480,823", dated Oct. 15, 2020, 12 Pages.

* cited by examiner

TIME OF FLIGHT CAMERA

BACKGROUND

A "continuous wave" time of flight (TOF) camera (CW-TOF), transmits a "continuous wave" of electromagnetic radiation, optionally infrared (IR) light, having intensity that is periodically modulated to illuminate a scene that the camera images. Light reflected from the transmitted light by a given feature in the scene reaches the camera as a wave of reflected light having a same modulation as the transmitted light but retarded in phase by a propagation phase delay, "$\varphi_d$", which is a function of a round trip time $t_R$ for light to propagate from the camera to the given feature and back to camera, and thereby a distance, "d", to the feature. The camera images the light reflected by the given feature on a pixel of a photosensor for each of a plurality of exposure periods to accumulate electric charge, "photocharge" that the imaged light generates in the pixel during the exposure period. For each of the exposure periods, sensitivity of the photosensor to light is modulated at a different sampling phase offset relative to phase of modulation of light that the camera transmits. The amount of photocharge accumulated for a given sampling phase offset is proportional to a convolution of the exposure period associated with the sampling phase offset and the reflected light, and is a function of propagation phase delay $\varphi_d$. The CW-TOF camera processes the accumulated photocharges for the different sampling phase offsets to determine $\varphi_d$ and therefrom and distance "d" to the feature.

SUMMARY

An aspect of an embodiment of the disclosure relates to providing a CW-TOF camera having reduced sensitivity to error generated by multipath interference (MPI) in a phase delay $\varphi_d$ and distance d that the camera determines to a given feature in a scene that the camera images.

In an embodiment, the CW-TOF camera illuminates a scene that the camera images with structured light, which produces different illumination zones in the scene that are distinguished by differences in characteristics of the structured light incident on features of the scene in different zones. For each sampling phase offset that the CW-TOF camera uses to determine propagation phase delays $\varphi_d$ and therefrom distances to features in the scene, the camera images the scene and features in the different illumination zones during a different exposure period for which the sampling phase offset is modified by a different one of a plurality of "perturbation phase shifts". During each exposure period the camera accumulates photocharge responsive to light that the features reflect from the structured light that illuminates the scene. The camera provides and processes voltages that represent the accumulated photocharges for different perturbation phase shifts and optionally different illumination zones so that contribution of MP light to photocharge accumulated for a feature in the scene and the sampling phase offset are substantially independent of the sampling phase offset. As a result, the CW-TOF camera is characterized by enhanced resistance to error generated by MPI in propagation phase delays $\varphi_d$ and distances d for features in the scene.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

Reflected light from a given feature in a scene that a CW-TOF camera images on a photosensor pixel is not limited to "direct light" that propagates directly from the camera light source to the given feature and back to the camera. Reflected light from the given feature may have "bounced" to the given feature from another feature in the scene before being reflected by the given feature to the CW-TOF camera. The bounced light from the other feature travels a longer path, a "multipath", to the camera than direct light and therefore has a different, and larger propagation phase delay than direct light. Photocharge generated by multipath (MP) light incident on the pixel therefore contaminates photocharge generated by direct light incident on the pixel and generates error due to MPI in the phase delay $\varphi_d$ and distance d to the given feature that the camera determines In the discussion below operation of a CW-TOF camera is discussed with reference to FIG. 1A which illustrates the CW-TOF camera imaging a scene to acquire a range image of the scene that provides distances to features of the scene in the absence of MPI. MPI and its effects on determination of propagation phase delays $\varphi_d$ and distances to features in a scene are discussed with reference to FIG. 1B, which schematically shows the CW-TOF camera shown in FIG. 1A imaging the same scene but in the presence of MPI. Structure and operation of CW-TOF cameras configured in accordance with an embodiment of the disclosure to reduce MPI error in propagation phase delay $\varphi_d$ and distance based on $\varphi_d$ are discussed with reference to FIG. 2.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one, or any combination of more than one of the items it conjoins.

Figure 1A:
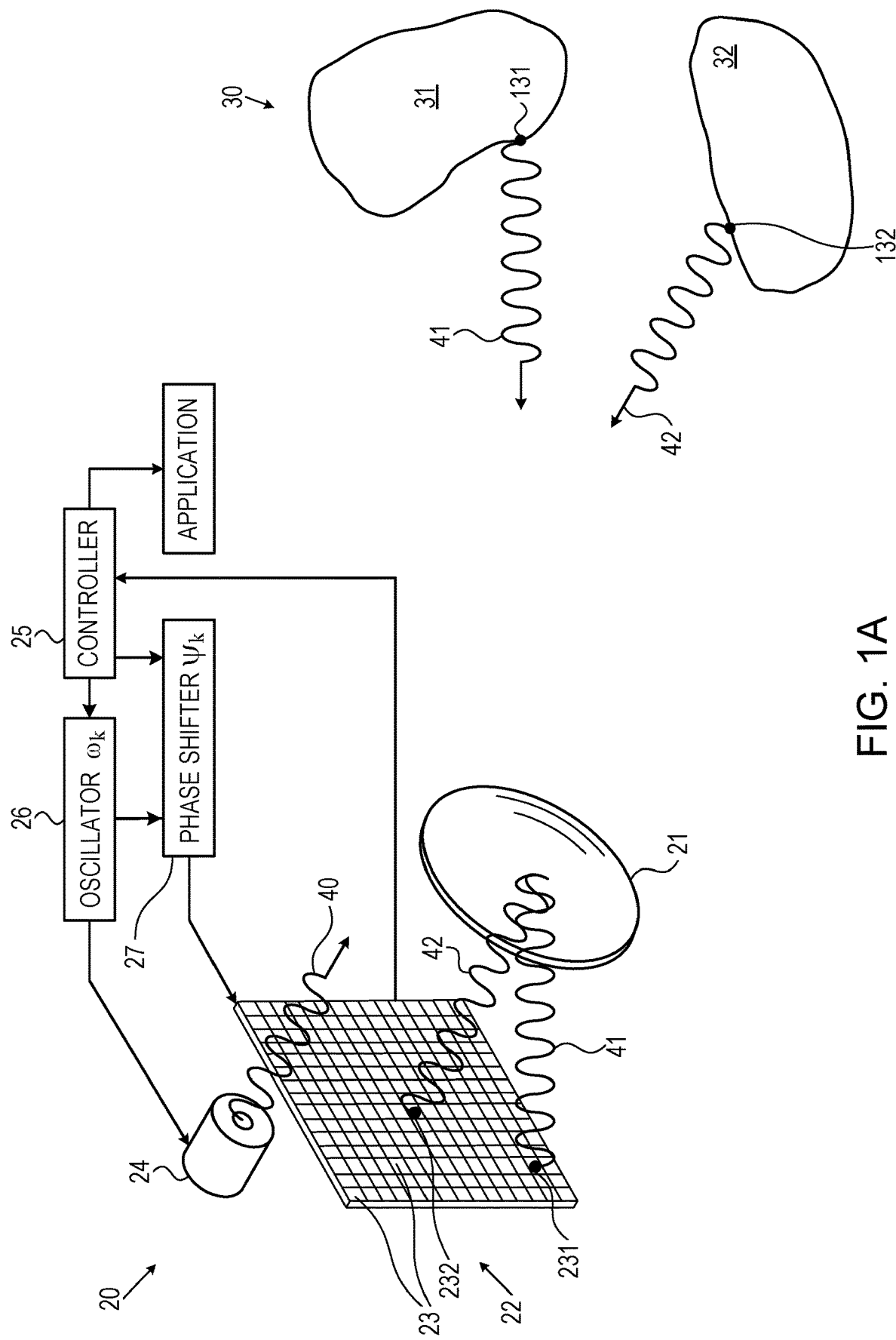
FIG. 1A schematically shows a CW-TOF camera determining distances to features in a scene in the absence of multipath interference (MPI)

FIG. 1A schematically shows a CW-TOF camera 20 operating to determine distances to features in a scene 30 optionally having objects 31 and 32. CW-TOF camera 20, which is represented very schematically, comprises an optical system represented by a lens 21, and a photosensor 22 having an array of rows and columns of pixels 23 on which optical system 21 images features of scene 30. A given pixel 23 in photosensor 22 may be designated p(i,j), where "i" and "j" are indices that indicate a row and a column respectively of photosensor 22 in which the pixel is located. A feature in scene 30 that CW-TOF camera 20 images on a pixel p(i,j) may be referred to as a feature f(i,j), and/or by a reference label. CW-TOF camera 20 may comprise a light source 24, an oscillator 26, a phase shifter 27, and a controller 25 that controls components comprised in the CW-TOF camera.

To acquire a range image of scene 30, controller 25 controls CW-TOF camera 20 to acquire a plurality of K images of scene 30 each at a different sampling phase offset $\psi_k$ of a plurality of K sampling phase offsets ($1 \leq k \leq K$), where $\psi_k$ is equal to $2\pi(k-1)/K$, where k and K are integers. For a k-th image of the K images, controller 25 controls oscillator 26 to provide a frequency signal having angular frequency $\omega_k$ and controls light source 24 to transmit light continuously modulated at the angular frequency provided by the oscillator. Light transmitted by light source 24 is schematically represented by a wavy line 40 having an arrow indicating direction of propagation of the transmitted light. While illuminating scene 30 with light 40, controller 25 turns on photosensor 22 for an exposure period "$Ex_k$" to register light that features in scene 30 reflect from transmitted light 40 back to camera 20 and optical system 21 images on pixels 23 of photosensor 22. During the exposure period controller 25 modulates sensitivity of photosensor 22 at angular frequency $\omega_k$ provided by oscillator 26, but controls phase shifter 27 to shift the phase of modulation of the photosensor by sampling phase offset $\psi_k$ relative to phase of modulation of transmitted light 40. Optionally, angular frequency $\omega_k$ is the same for all values of k and is hereinafter assumed for convenience of presentation equal to an angular frequency "$\omega$".

A pixel 23 in photosensor 22 registers light reflected from a feature in scene 30 that optical system 21 images on the pixel during exposure period $Ex_k$ by accumulating photocharge that the light generates in the pixel during the exposure period. By way of example, FIG. 1A schematically shows features 131 and 132 of objects 31 and 32 respectively, reflecting light from light 40 back to CW-TOF camera 20. Reflected light from feature 131 is schematically represented by a wavy line 41 having an arrow indicating direction of propagation of the light, which optical system 21 images on a pixel 23, p(i,j), which is designated pixel 231 in photosensor 22. An amount of photocharge that pixel 231 accumulates is proportional to a convolution of reflected light 41 with sensitivity exposure period $Ex_k$. The convolution is a function of sampling phase offset $\psi_k$ and a propagation delay $\varphi_d(131)$ resulting from a round trip time $t_R$ for light to travel from light source 24 to feature 131 and back to CW-TOF camera 20. In symbols, $\varphi_d(131) = \omega t_R(131)$, where $t_R(131)$ is a round trip time for light to travel from light source 24 to feature 131 and back to the camera. Since $t_R(131)$ is equal to $2d(131)/c$, where $d(131)$ is the distance from CW-TOF camera 20 to feature 131 and c the speed of light, propagation phase delay $\varphi_d(131)$ is also equal to $2\omega d(131)/c$. Similarly, reflected light from feature 132 is schematically represented by a wavy line 42 and direction arrow, which is imaged by optical system 21 on a pixel 232, and an amount of photocharge that pixel 232 accumulates for feature 132 during exposure period $Ex_k$ is proportional to a convolution of reflected light 42 with the exposure period. The convolution is a function of sampling phase offset $\psi_k$ and a propagation phase delay $\varphi_d(132) = 2\omega d(132)/c$, which because feature 132 is closer to CW-TOF camera 20 is less than $\varphi_d(131)$.

At the end of each exposure period $Ex_k$, controller 25 reads photosensor 22 to acquire a frame of the photosensor for the sampling phase offset $\psi_k$. The frame comprises voltages representing the accumulated photocharges and corresponding amounts of reflected light registered by pixels 23 in photosensor 22 during exposure period $Ex_k$ for features in scene 30 respectively imaged on the pixels. Controller 25 may process the voltages provided by the frames for all K sampling phase offsets $\psi_k$, $1 \leq k \leq K$ to extract propagation phase delays $\varphi_d(i,j)$ for respective pixels p(i,j) of pixels 23 and associated distances d(i,j) for features, f(i,j), imaged on pixels p(i,j) as discussed below.

Transmitted light 40, reflected light, such as light 41 and 42 reflected from transmitted light 40 by features 131 and 132, and modulated sensitivity of pixels in photosensor 22 during an exposure period $Ex_k$ are periodic functions, and each may advantageously be expressed as a Fourier cosine series. Intensity of transmitted light 40 as a function of time during exposure period $Ex_k$ may therefore be represented by $$I_k(t) = \Sigma_0^\infty I_{k,n} \cos(n\omega t). \tag{1}$$

and intensity of light reflected from light 40 by a feature f(i,j) in scene 30 that is imaged by CW-TOF camera 20 on a given pixel p(i,j) of pixels 23 during exposure period $Ex_k$ may be represented by $$R_k(i,j,\varphi_d(i,j)t) = \Sigma_0^\infty R(i,j)_{k,n} \cos(n\omega t + n\varphi_d(i,j)). \tag{2}$$

If the sensitivity of pixels 23 in photosensor 22 during exposure period $Ex_k$ is represented by $S_k(t) = \Sigma_0^\infty S_{k,n} \cos(n\omega t + n\psi_k)$, the convolution, $CV_k(i,j) \equiv S_k(t) * R_k(i,j,t)$, of $R_k(i,j,t)$ and $S_k(t)$ for pixel p(i,j) may be expressed, $$CV_k(i,j,\varphi_d(i,j),\psi_k) \equiv S_k(t) * R_k(i,j,t) = \Sigma_0^\infty S_{k,n} R_{k,n} \cos(n\psi_k + n\varphi_d(i,j)) \tag{3}$$

Then, if $V_k(i,j,\varphi_d(i,j),\psi_k)$ is a voltage in a frame of photosensor 22 representing an amount of photocharge accumulated by pixel p(i,j) during exposure period $Ex_k$ acquired following the exposure period, $V_k(i,j,\varphi_d(i,j),\psi_k)$ may be written, $$V_k(i,j,\varphi_d(i,j),\psi_k) = \alpha CV_k(i,j,\varphi_d(i,j),\psi_k) = \alpha \Sigma_0^\infty S_{k,n} R(i,j)_{k,n} \cos(n\psi_k + n\varphi_d(i,j)), \tag{4}$$

where $\alpha$ is a proportionality coefficient.

For intensity of transmitted light characterized by a single dominant modulation frequency and/or for which harmonics of the dominant frequency may advantageously be ignored, transmitted light 40 may be approximated by an expression, $$I_k(t) = \Sigma_0^\infty I_{k,n} \cos(n\omega t) \approx I_0 + I_1 \cos \omega t, \tag{5}$$

and light from a feature f(i,j) in scene 30 imaged on a pixel p(i,j) advantageously approximated by an expression, $$R_k(i,j,t) = \Sigma_0^\infty R(i,j)_{k,n} \cos(n\omega t + n\varphi_d(i,j)) \approx R_0 + R_1 \cos(\omega t + \varphi_d(i,j)). \tag{6}$$

Assuming that modulation of sensitivity of photosensor 22 during an exposure period $Ex_k$ may be expressed, $$S_k(t) = \Sigma_0^\infty S_{k,n} \cos(n\omega t + n\psi_k) \approx S_0 + S_1 \cos(\omega t + \psi_k), \tag{7}$$

the convolution of exposure period $Ex_k$ and light $R_k(i,j,t)$ reflected by a feature $f(i,j)$ in scene 30 and imaged on a pixel 23 $p(i,j)$ becomes, $$CV_k(i,j,\varphi_d(i,j),\psi_k) = S_0 R(i,j)_0 + S_1 R(i,j)_1 \cos(\psi_k + \varphi_d(i,j)). \quad (8)$$

Voltage representing the photocharge accumulated by $p(i,j)$ during the exposure period, $$V_k(i,j,\varphi_d(i,j),\psi_k) = \alpha C\, V_k(i,j,\varphi_d(i,j),\psi_k) = \alpha[S_0 R(i,j)_0 + S_1 R(i,j)_1 \cos(\psi_k + \varphi_d(i,j))], \quad (9)$$

which may be written in a form, $$V_k(i,j,\varphi_d(i,j),\psi_k) = A(i,j) + B(i,j)\cos(\psi_k + \varphi_d(i,j)) \quad (10)$$

Controller 25 may determine propagation phase delay $\varphi_d(i,j)$ for a feature $f(i,j)$ imaged on pixel $p(i,j)$ in accordance with an expression, $$\varphi_d(i,j) = \operatorname{atan}[-\Sigma_{k=1}^{k=K} V_k(i,j,\varphi_d(i,j),\psi_k)\sin(\psi_k)/\Sigma_{k=1}^{k=K} V_k(i,j,\varphi_d(i,j),\psi_k)\cos(\psi_k)] = \operatorname{atan}[-\Sigma_{k=1}^{k=K} B(i,j)\cos(\psi_k+\varphi_d(i,j))\sin(\psi_k)/\Sigma_{k=1}^{k=K} B(i,j)\cos(\psi_k+\varphi_d(i,j))\cos(\psi_k)] \quad (11)$$

and distance $d(i,j)$ to feature $f(i,j)$ in accordance with, $$d(i,j) = [c/2\omega]\varphi_d(i,j). \quad (12)$$

By way of specific example, for feature 131 of object 31 that CW-TOF camera 20 images on pixel 231, controller 25 may determine a propagation phase delay $$\varphi_d(231) = \operatorname{atan}[-\Sigma_{k=1}^{k=K} V_k(231,\varphi_d(231),\psi_k)\sin(\psi_k)/\Sigma_{k=1}^{k=K} V_k(231,\varphi_d(231),\psi_k)\cos(\psi_k)], \quad (13)$$

and distance to the feature, $$d(131) = [c/2\omega]\varphi_d(231). \quad (14)$$

The discussion above referencing features in FIG. 1A assumes absence of MPI, and that therefore amounts of photocharge accumulated by pixels 23 during an exposure period $Ex_k$ are generated only by light reflected by features in scene 30 from direct light, that is, light that reaches the features directly from light source 24. However, in general, accumulation of photocharge by pixels in a CW-TOF camera is generally contaminated by photocharge generated by MP light.

Figure 1B:
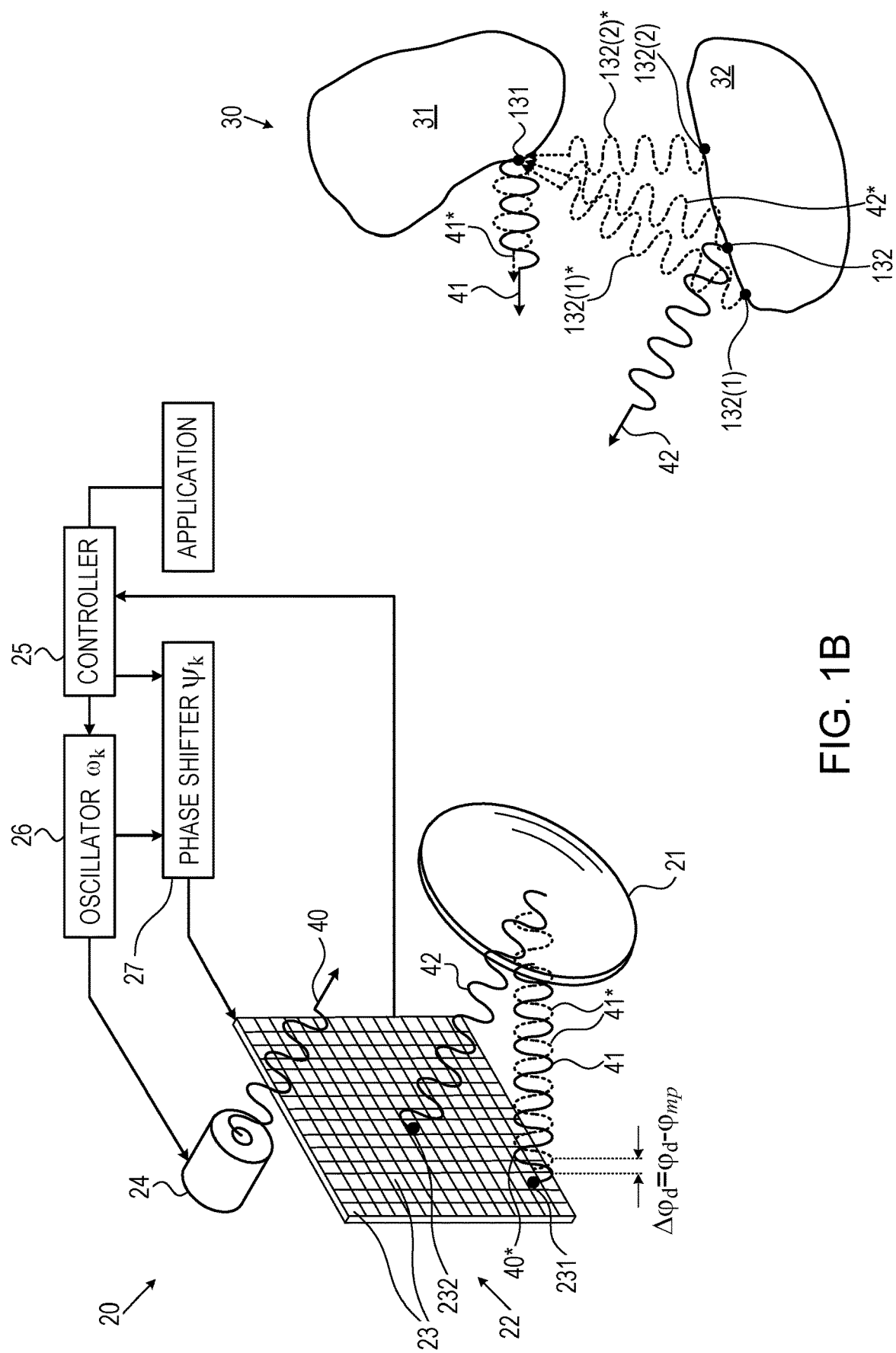
FIG. 1B schematically shows the CW-TOF camera shown in FIG. 1A determining distances to features in the scene in the presence of MPI.

FIG. 1B by way of example schematically shows CW-TOF camera 20 imaging scene 30 in the presence of MPI. The figure illustrates how MPI may affect photocharge accumulated by pixel 231 on which CW-TOF camera 20 images reflected light from feature 131 during an exposure period $Ex_k$ of photosensor 22.

FIG. 1B, schematically shows that some of light 40 transmitted by light source 24 and incident on feature 132 as well as, by way of example, features 132(1) and 132(2) of object 32 is not reflected directly back to CW-TOF camera 20 for imaging the features, but is reflected instead to illuminate feature 131. Light reflected from features 132, 132(1), and 132(2) to illuminate feature 131 is MP light, having traveled multiple distinct path segments from light source 24 to feature 131, and is represented by dashed wavy lines 42*, 132(1)*, and 132(2)* respectively. Some of MP light 42*, 132(1)*, and 132(2)* that is incident on feature 131 is reflected by feature 131 to CW-TOF camera 20 and is imaged on pixel 231 together with direct light from light source 24 reflected by the feature.

Light reflected by feature 131 from transmitted light 40 that directly illuminates feature 131 that CW-TOF camera 20 images on pixel 231 is represented in FIG. 1B, as in FIG. 1A, by light 41. Whereas MP light 42*, 132(1)*, and 132(2)* travel different multipaths from light source 24 to feature 131 and light from each multipath that is reflected by feature 131 to CW-TOF camera 20 reaches pixel 231 generally with a different propagation phase delay, the MP light reflected by feature 131 is, for convenience of presentation, collectively represented in FIG. 1B by a same dashed wavy line 41*. Light 41* is shown displaced back of light 41 in FIG. 1B to indicate that reflected MP light 41* is retarded by propagation phase delay greater than a propagation phase delay characterizing direct light 41.

Assume that a given feature $f(i,j)$ in scene 30 that CW-TOF camera 20 images on pixel $p(i,j)$ receives MP light reflected from transmitted light 40 by features $f(i',j')$ in the scene for which $i' \neq i$, or $j' \neq j$. When feature $f(i,j)$ reflects the MP light it receives to CW-TOF camera 20 during an exposure period $Ex_k$, the reflected MP light contributes to photocharge accumulated by pixel $p(i,j)$ during the exposure period, and thereby to voltage $V_k(i,j,\varphi_d(i,j),\psi_k)$ representing the accumulated photocharge. Since photocharge generated in a photosensor pixel $p(i,j)$ by light incident on the pixel is generally a linear function of the incident light, an amount of photocharge accumulated by pixel $p(i,j)$ during exposure period $Ex_k$, is a sum of photocharge generated by reflected direct light and reflected MP light incident on the pixel. By way of example, for feature 131 shown in FIG. 1B photocharge generated in pixel 231 by incident light during an exposure period $Ex_k$ may be a sum of photocharge generated by reflected direct light 41 and reflected MP light 41*. Reflected light 41*, as noted above, includes light reflected from MP light 132(1)*, 132(2)* and 41* reaching feature 131 from features 132(1), 132(2) and 132 respectively.

Therefore, for feature $f(i,j)$ imaged by CW-TOF camera 20 on pixel $p(i,j)$, voltage $V_k(i,j,\varphi_d(i,j),\psi_k)$ representing photocharge accumulated by the pixel during exposure period $Ex_k$ is a sum of a voltage, $V_k(i,j,\varphi_d(i,j),\psi_k)_D$, representing photocharge accumulated responsive to direct light that $f(i,j)$ reflects and CW-TOF camera 20 images on $p(i,j)$ and a voltage, $V_k(i,j,\psi_k)_{mp}$, representing photocharge, "MP photocharge", accumulated responsive to MP light that $f(i,j)$ reflects and the camera images on pixel $p(i,j)$. Voltage $V_k(i,j,\varphi_d(i,j),\psi_k)$ may therefore be given by an expression $$V_k(i,j,\varphi d(i,j),\psi_k) = V_k(i,j,\varphi_d(i,j),\psi_k)_D + V_k(i,j,\psi_k)_{mp} \quad (15)$$

In expression (15), $V_k(i,j,\varphi_d(i,j),\psi_k)_D$ is given by expression (10) above and may be written, $$V_k(i,j,\varphi_d(i,j),\psi_k)_D = [A(i,j) + B(i,j)\cos(\psi_k + \varphi_d(i,j))]. \quad (16)$$

Voltage $V_k(i,j,\psi_k)_{mp}$ may similarly be given by an expression $$V_k(i,j,\psi_k)_{mp} = \Sigma_{i',j'}[A_{mp}(i,j,i',j') + B(i,j,i',j')_{mp}\cos(\psi_k + \varphi_d(i,j,i',j'))], \quad (17)$$

where the sum in expression (17) is taken over indices of features $f(i',j')$ that illuminate feature $f(i,j)$ with MP light during exposure period $Ex_k$. The phase $\varphi_d(i,j,i',j')$ in (17) is a propagation phase delay that MP light from feature $f(i',j')$ experiences in propagating from CW-TOF camera 20 to $f(i',j')$, from $f(i',j')$ to $f(i,j)$, and from $f(i,j)$ back to CW-TOF camera 20.

It is readily seen from expression (17) that reflected MP light adds MP photocharge to photocharge generated by reflected direct light from feature $f(i,j)$, and generates error in propagation phase delay $\varphi_d(i,j)$, and thereby distance $d(i,j)$ to feature $f(i,j)$ that CW-TOF camera 20 may determine based on the propagation phase delay.

Figure 2:
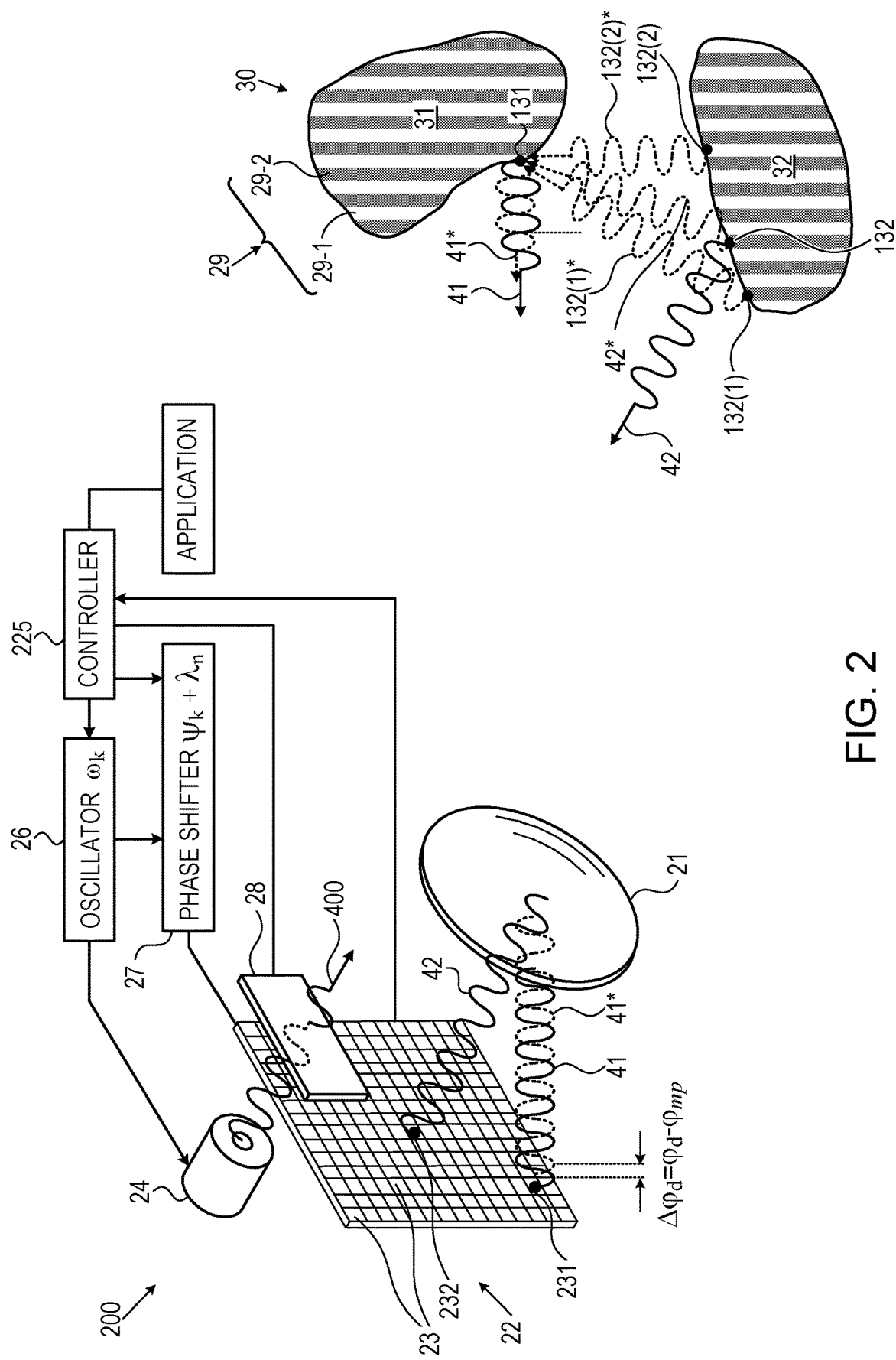
FIG. 2 shows a CW-TOF camera configured to exhibit enhanced resistance to MPI error determining distance to features in the scene shown in FIGS. 1A and 1B, in accordance with an embodiment of the disclosure.

FIG. 2 schematically shows a CW-TOF camera 200 in accordance with an embodiment of the disclosure configured to reduce error due to MP photocharge. CW-TOF 200 optionally comprises components similar to components comprised in CW-TOF camera 20, but may have a controller 225 that replaces controller 25 comprised in CW-TOF 20, and in addition may have an optical pattern generator 28. CW-TOF camera 200 is shown imaging scene 30 shown in FIGS. 1A and 1B.

To provide a range image of scene 30, controller 225 operates CW-TOF camera 200 to acquire an image of the scene during each of K exposure periods $Ex_k$ ($1 \leq k \leq K$) of photosensor 22 for which the controller controls oscillator 26 and light source 24 to transmit light 40 modulated at frequency $\omega$ to illuminate the scene. For a k-th exposure period $Ex_k$, controller 225 controls photosensor 22 and phase shifter 27 to modulate sensitivity of pixels p(i,j) at a frequency $\omega$ but phase shifted by a sampling phase offset $\psi_k$, where $\psi_k = 2\pi(k-1)/K$, modified by a sequence of N "perturbation phase shifts" $\lambda_n$ ($1 \leq n \leq N$), where $\lambda_n = 2\pi(n-1)/N$, and n and N are integers. For a sampling phase offset $\psi_k$, controller 225 may modulate sensitivity of photosensor 22 during exposure period $Ex_k$ for a sequence of N equal perturbation time periods $\tau_n$ ($1 \leq n \leq N$) for which sensitivity of photosensor 22 for a period $\tau_n$ is equal to, $$S_{k,n}(t)=[S_0+S_1 \cos(\omega t+\psi_k+\lambda_n)]. \quad (18)$$

During exposure period $Ex_k$ controller also 225 controls optical pattern generator 28 to modulate transmitted light 40 to generate structured light 400 that illuminates scene 30 and produces a corresponding structured illumination pattern of features f(i,j) in the scene. The structured illumination pattern comprises a plurality of regions, hereinafter also referred to as illumination zones, of scene 30. Illumination zones may be of a same or different type. Features f(i,j) of scene 30 in different types of illumination zones are illuminated differently by structured light 400 during exposure period $Ex_k$. Features f(i,j) in a same illumination zone and features f(i,j) in different illumination zones of a same type are illuminated similarly during the exposure period. Illumination zones may be discrete illumination zones delimited and separated by relatively well-defined boundaries in a scene imaged by CW-TOF camera 200 and across which illumination exhibits relatively abrupt changes. Illumination zones may be continuous illumination zones that do not exhibit relatively well-defined boundaries across which illumination exhibits relatively abrupt changes. Continuous illumination zones in scene 30 may for example exhibit change in illumination that is a relatively gradual function of location characterized by continuous spatial gradients in intensity or wavelength of illumination. Gradients may for example be generated by time dependent change of illumination of different regions of scene 30 that are continuous rather than discrete functions of location of the regions. Different continuous illumination zones may be characterized by different parameters, such as phase of temporal development, defining functions characterizing illumination they respectively receive from structured light 400.

A structured illumination pattern simultaneously comprises at least two different types of illumination zones. For example, structured light 400 that optical pattern generator 28 provides may generate a structured illumination pattern simultaneously comprising two different types of illumination zones—bright illumination zones and dark illumination zones, the bright illumination zones having features f(i,j) that receive more light from pattern generator 28 than the dark illumination zones. The bright and dark illumination zones may comprise bright strips of illuminated features f(i,j) interleaved with dark strips of non-illuminated features f(i,j). The bright and dark illumination zones may comprise a speckle pattern of brighter and darker "islands" of features f(i,j) or a tiling of brighter and darker regions. A structured illumination pattern may comprise more than two illumination zones and may for example have three illumination zones each receiving different intensity or wavelength of transmitted light from pattern generator 28. In FIG. 2, by way of example, optical pattern generator 28 is shown generating structured light 400 that produces a structured illumination pattern 29 comprising discrete illumination zones that are bright and dark strips 29-1 and 29-2 respectively.

Pattern generator 28 may be any of various devices for generating structured light and may for example comprise an array of micromirrors, an array of liquid crystal cells, and/or an optical scanner configured to receive light 40 and direct portions of the received light to generate structured light that illuminates scene 30 with desired structured illumination patterns. Alternatively and/or additionally light source 40 may comprise an array of independently controllable lasers and/or light emitting diodes (LEDs), which controller 225 may control to generate a desired structured illumination pattern on scene 30. It is noted that whereas light source 24 and pattern generator 28 shown in FIG. 2 are discussed as separate entities, the term light source may be used to refer generically to any optical apparatus operable to provide structured light to illuminate a scene with a structured illumination pattern in accordance with an embodiment of the disclosure In accordance with an embodiment, during exposure period $Ex_k$ controller 225 controls pattern generator 28 to modify structured light 400 to modify light illuminating features in a given illumination zone in accordance with a sequence of multiplicative optical pattern modifiers in synchrony with the sequence of perturbation phase shifts $\lambda_n$. Features in different types of illumination zones may be illuminated in synchrony with perturbation phase shifts $\lambda_n$ with different sequences of optical pattern modifiers. Sequences of optical pattern modifiers in accordance with an embodiment may be different because they are different sequences of same optical modifiers or sequences of different optical modifiers. An optical pattern modifier may be said to modify structured light 400 or to modify corresponding illumination of features in scene 30 that receive the structured light modified by the optical pattern modifier.

Let a number of optical pattern modifiers be the same as the number of different perturbation phase shifts and be represented by $P_z$ ($1 \leq z \leq Z$) where $Z=N$. Optical pattern modifiers having different subscripts z may have a same functional form but are distinguished because they are used during different perturbation time periods $\tau_n$. Since a sequence of optical pattern modifiers $P_z$ is different for different illumination zones, which optical pattern modifier $P_z$ is synchronized with a given perturbation phase shift $\lambda_n$ during exposure period $Ex_k$ depends on the illumination zone as well as the perturbation phase shift. Illumination that a given feature f(i,j) in scene 30 receives during the exposure period depends on the type of illumination zone in which it is located, which is a function of its indices (i,j). Therefore if $I(i,j,n,t)_{400}$ represents intensity of light that feature f(i,j) receives during a perturbation time period $\tau_n$ of exposure period $Ex_k$, for which sensitivity modulation of photosensor 22 is phase shifted by a phase ($\psi_k+\lambda_n$), the intensity may be written, $$I(i,j,n,t)_{400}=P_z(i,j,n)(I_0+I_1 \cos \omega t), \quad (18)$$

where the dependence of the subscript z expresses the dependence of optical pattern modifier $P_z$ on index n and the illumination zone.

Intensity of direct light reflected by a feature f(i,j) from light 400 that reaches the feature directly from optical pattern generator 28 and is imaged on pixel p(i,j) by CW-TOF camera 200 during a period $\tau_n$ of exposure period $Ex_k$ may be written, $$R_{k,n}(i,j,t)=P_z(i,j,n)(R_0+R_1\cos(\omega t+\varphi_d(i,j))). \quad (20)$$

Light from indirect, MP light, from a feature f(i',j') that illuminates and is reflected by feature f(i,j) which CW-TOF camera 200 images on pixel p(i,j) may be written, $$R_{mp,k,n}(i,j,i',j',t)=P_{z(i',j',n)}(R_{mp,o}(i,j,i',j')+R_{mp,1}(i,j,i',j')\cos(\omega t+\varphi_d(i,j,i',j'))). \quad (21)$$

Voltage $V_k(i,j,\varphi_d(i,j),\psi_k)$ representing photocharge accumulated by pixel p(i,j) responsive to a convolution of direct and MP light from feature f(i,j) that CW-TOF camera 200 images on p(i,j) is, as given by the expression (15), $V_k(i,j,\varphi_d(i,j),\psi_k)=V_k(i,j,\varphi_d(i,j),\psi_k)_D+V_k(i,j,\psi_k)_{mp}$, but with $V_k(i,j,\varphi_d(i,j),\psi_k)_D$ and $V_k(i,j,\psi_k)_{mp}$ modified through dependence on $P_z(i,j,n)$ and perturbation phases $\lambda_n$. In particular, expression (16) for direct voltage $V_k(i,j,\varphi_d(i,j),\psi_k)_D$ representing direct photocharge is modified and becomes, $$V_k(i,j,\varphi_d(i,j),\psi_k)_D=\Sigma_n P_{z(i,j,n)}[A(i,j)+B(i,j)\cos(\psi_k+\lambda_n+\varphi_d(i,j))]. \quad (22)$$

And expression (17) for MP voltage $V_k(i,j,\psi_k)_{mp}$ representing MP photocharge is modified to an expression, $$V_k(i,j,\psi_k)_{mp}=\Sigma_n\Sigma_{i',j'}P_{z(i',j',n)}[A_{mp}(i,j,i',j')+B(i,j,i',j')_{mp}\cos(\psi_k+\lambda_n+\varphi_d(i,j,i',j'))]. \quad (23)$$

In an embodiment, a spatial pattern for structured light that optical pattern generator 28 produces is chosen so that the sum over indices i',j' in expression (23) substantially satisfies a constraint, $$\Sigma_n\Sigma_{i',j'}P_{z(i',j',n)}B(i,j,i',j')_{mp}\cos(\psi_k+\lambda_n+\varphi_d(i,j,i',j'))=0 \quad (24)$$

In an embodiment, to satisfy constraint (24) controller 225 controls optical pattern generator 28 to configure structured light pattern 400 so that the sum $\Sigma_{i',j'}[P_z(i',j',n)B(i,j,i',j')_{mp}]$ over indices i', j' is "homogenized", and substantially equal to a constant for a given p(i,j), and independent of n for distances between features f(i',j') in scene 30 that illuminate feature f(i,j) with MP light, and for which $\varphi_d(i,j,i',j')$ is substantially the same.

In an embodiment, to provide a homogenizing light pattern, controller 225 may control optical pattern generator 28 so that structured light 400 illuminates scene 30 to produce illumination pattern 29 schematically shown in FIG. 2 comprising strips of illuminated, "bright", features f(i,j) interleaved with strips of non-illuminated, "dark", features f(i,j) in the scene and for which adjacent strips alternate between being bright and dark with change in subscript n. Pitch of the dark and bright strips is determined to "homogenize" MP light from features f(i',j') that reflect MP light to a feature f(i,j) so that the sum $\Sigma_{i',j'}[P_z(i', j',n)B(i,j,i',j')_{mp}]$ does not change and is substantially independent of index n. For example bright and dark strips in scene 30 may be imaged on corresponding strips of pixels 23 in photosensor 22 that are advantageously a few pixels wide. Optionally, the strips of pixels 23 may by way of example be less than 10 pixels wide. In an embodiment the strips may be between 2 and 5 pixels wide. Optionally, the strips are 4 pixels wide.

For voltage $V_k(i,j,\varphi_d(i,j),\psi_k)$ for which expressions (15), (22), and (23) are valid, $V_k(i,j,\varphi_d(i,j),\psi_k)$ may be written, $$V_k(i,j,\varphi_d(i,j),\psi_k)=\Sigma_n P_{z(i,j,n)}[A(i,j)+B(i,j)\cos(\psi_k+\lambda_n+\varphi_d(i,j))]+\Sigma_n\Sigma_{i',j'}P_{z(i',j',n)}A_{mp}(i,j,i',j') \quad (25)$$

Noting, as discussed above with respect to constraint (24), that $\Sigma_{i',j'}[P_{z(i',j',n)}B(i,j,i',j')_{mp}]$ is independent of n for a given pixel p(i,j), that $\Sigma_{i',j'}P_{z(i',j',n)}[A_{mp}(i,j,i',j')]$ is therefore also constant and substantially independent of n for the given pixel and may be written, $$\Sigma_{i',j'}P_{z(i',j',n)}[A_{mp}(i,j,i',j')]=C_{mp}(i,j). \quad (26)$$

Using expression (26) and setting $$\Sigma_n P_{z(i,j,n)}A(i,j)=C_D(i,j), \quad (27)$$

expression (25) for $V_k(i,j,\varphi_d(i,j),\psi_k)$ may be written, $$V_k(i,j,\varphi_d(i,j),\psi_k)=C_D(i,j)+\Sigma_n P_{z(i,j,n)}B(i,j)\cos(\psi_k+\lambda_n+\varphi_d(i,j)))+NC_{mp}(i,j), \quad (28)$$

where, as noted above (1≤n≤N).

Let a phase shift $\xi(i,j)$ for a pixel p(i,j) be defined so that $$\xi(i,j)=\mathrm{atan}(\Sigma_n P_{z(i,j,n)}\sin(\lambda_n)/\Sigma_n P_{z(i,j,n)}\cos(\lambda_n)), \quad (29)$$

then expression 28 may be written, $$V_k(i,j,\varphi_d(i,j),\psi_k)=C_D(i,j)+NC_{mp}(i,j)+B(i,j)[(\Sigma_n P_{z(i,j,n)}\sin\lambda_n)^2+(\Sigma_n P_{z(i,j,n)}\cos\lambda_n)^2]^{1/2}\cos(\psi_k+\varphi_d(i,j)+\xi(i,j)), \quad (30)$$

which may be rewritten for convenience in a form $$V_k(i,j,\varphi_d(i,j),\psi_k)=C(i,j)+B(i,j)^*\cos(\psi_k+\varphi_d(i,j)+\xi(i,j)) \quad (31)$$

where $$C(i,j)=C_D(i,j)+NC_{mp}(i,j), \quad (32)$$

and $$B(i,j)^*=B(i,j)[(\Sigma_n P_{z(i,j,n)}\sin\lambda_n)^2+(\Sigma_n P_{z(i,j,n)}\cos\lambda_n)^2]^{1/2}. \quad (33)$$

Phase shift $\xi(i,j)$, which may also be referred to as a "pattern phase" or a "spatial phase", may be generated by a pixel p(i,j) imaging a feature located in a given illumination zone, for which the sum $\Sigma_n P_{z(i,j,n)}\sin(\lambda_n)$ is not equal to zero. Pattern phase shift $\xi(i,j)$ defined in expression (29) is produced, in accordance with an embodiment, by a time dependence of illumination of the illumination zone associated with pixel p(i,j) generated by structured illumination pattern 400 and synchronized during an exposure period $Ex_k$ with a sequence of −global perturbation phase shifts $\lambda_n$. An illumination zone may be said to be associated with a pixel p(i,j) if a feature f(i,j) imaged on the pixel is located in the illumination zone, and a pixel p(i,j) may be said to be "in" an illumination zone of a feature f(i,j) imaged on the pixel. Pattern phase $\xi(i,j)$ may be different for different illumination zones and may result in pixels in different types of illumination zones accumulating different quantities of photocharge for features in scene 30 at a same distance from CW-OF camera 200. The different amounts of photocharge and consequential different corresponding voltages $V_k(i,j,\varphi_d(i,j),\psi_k)$ may be due to the sequences of pattern modifiers $P_{z(i,j,n)}$ associated with the different illumination zones synchronizing differently with the same sequence of perturbation phase shifts. Furthermore depending on configuration of a CW-TOF camera, such as CW-TOF camera 200, an illumination zone in which a feature f(i,j) imaged by a given pixel p(i,j) is located may depend on distance of the feature from the camera. As a result, values for $\xi(i,j)$ may be a function of distance of a feature imaged by the given pixel. Values for $\xi(i,j)$ for a given illumination pattern zone may be determined in a calibration procedure of CW-TOF camera 20 and stored in a memory of controller 225. The calibration procedure for CW-TOF camera 20 may, by way of example comprise imaging features at known distances from the camera.

Expressions (28)-(31) show that MP light contributes only a constant term, $NC_{mp}(i,j)$, independent of sampling phase offset $\psi_k$, to voltage $V_k(i,j,\varphi_d(i,j),\psi_k)$ that CW-TOF camera 200 provides for pixel p(i,j) and feature f(i,j) from scene 30 imaged on the pixel. Terms that are independent of sampling phase offset $\psi_k$ do not contribute to propagation phase delay $\varphi_d(i,j)$ determined by summing as in expression (11). Therefore, CW-TOF camera 200 configured in accordance with an embodiment of the disclosure to image a scene using perturbation phase shifts $\lambda_n$ in synchrony with optical pattern modifiers $P_{z(i,j,n)}$ provides a range image of the scene that is characterized by reduced MPI error.

Given pattern phase $\xi(i,j)$ and expression (31), propagation phase delay $\varphi_d(i,j)$, may be determined in accordance with expressions similar to expression (11), $$\varphi_d(i,j) = \operatorname{atan}[-\Sigma_{k=1}^{k=K} V_k(i,j,\varphi_d(i,j),\psi_k)\sin(\psi_k)/ \Sigma_{k=1}^{k=K} V_k(i,j,\varphi_d(i,j),\psi_k)\cos(\psi_k)] - \xi(i,j) \quad (34)$$

or, advantageously for moderating phase wrapping effects, $$\varphi_d(i,j) = \operatorname{atan}[-\Sigma_{k=1}^{k=K} V_k(i,j,\varphi_d(i,j),\psi_k)\sin(\psi_k + \xi(i,j))/ \Sigma_{k=1}^{k=K} V_k(i,j,\varphi_d(i,j),\psi_k)\cos(\psi_k + \xi(i,j))], \quad (35)$$

And B(i,j)* in expression (33) may be determined in accordance with an expression, $$B(i,j)^* = \sqrt{\left[\sum_{k=1}^{k=K} V_k(i,j,\varphi_d(i,j),\psi_k)\sin\psi_k\right]^2 + \left[\sum_{k=1}^{k=K} V_k(i,j,\varphi_d(i,j),\psi_k)\cos\psi_k\right]^2} \quad (36)$$

Controller 225 may be configured to control phase shifter 27 and optical pattern generator to provide different sets, hereinafter also referred to as anti-MPI (AMPI) sets, of perturbation phase shifts $\lambda_n$ and corresponding optical pattern modifiers $P_{z(i,j,n)}$ so that voltage $V_k(i,j,\varphi_d(i,j),\psi_k)$ has a form given by expression (28) or (31). An AMPI set may be based on any of various types of structured light patterns for illuminating a scene imaged by a CW-TOF range camera in accordance with an embodiment of the disclosure with a pattern of illumination that varies spatially in the scene. The structured light pattern may for example, be any of a discrete, continuous, regular, irregular, or random pattern, or a pattern that is a combination of any two or more of the example patterns. For a given AMPI set, optical pattern modifiers $P_{z(i,j,n)}$ modify light from light source 24 to produce spatially structured light that may partition scene 30 into illumination zones optionally comprising a plurality of N different types of illumination zones. And as noted above for a same sequence of perturbation phase shifts $\lambda_n$, structured light 400 may illuminate different illumination zones in scene 30 with light modified by a different sequence of optical pattern modifiers $P_{z(i,j,n)}$. In an embodiment the different sequences of optical pattern modifiers $P_{z(i,j,n)}$ may be cyclic permutations of the same optical pattern modifiers.

For example, if for pixels p(i,j) imaging features f(i,j) in a first type of illumination zone, CW-TOF camera 200 pairs perturbation phase shifts in a sequence of perturbation phase shifts $\lambda_1, \lambda_2, \lambda_3, \lambda_4$, with respective optical pattern modifiers in a sequence $P_1, P_2, P_3, P_4$, for pixels p(i,j) in a second, different type of illumination zone, the same sequence of perturbation phase shifts may be paired respectively with pattern modifiers in the sequence $P_4, P_1, P_2, P_3$. The sequence of pattern modifiers associated with the second illumination zone is a cyclic permutation of the sequence of pattern modifiers associated with the first illumination zone.

Hereinafter arguments (i,j) for an optical pattern modifier $P_1(i,j)$ may be omitted, it being understood that the optical pattern modifier is associated with pixels in an illumination zone with which the pattern modifier is associated.

By way of example, in an embodiment an AMPI set may comprise N=2 perturbation phase shifts $\lambda_n$ with $\lambda_1 = 2\pi(n-1)/N = (n-1)360°/N = 0°$ and $\lambda_2 = 180°$, and two optical pattern modifiers $P_1$ and $P_2$, which may be binary constants having values $P_1=1$ and $P_2=0$. Scene 30 may comprise two types of illumination zones, corresponding to bright and dark regions 29-1 and 29-2 shown in FIG. 2 and having pattern phases $\xi(i,j)$ equal to 0° and 180° respectively. Let the two types of illumination zones be noted as Z1 and Z2. During an exposure period $Ex_k$, the illumination zones alternate between being bright and dark: when Z1 is bright, Z2 is dark; and when Z1 is dark, Z2 is bright. The zones are distinguished by the sequences of optical pattern modifiers $(P_1, P_2)$ that are synchronized with the sequences of perturbation phase shifts $(\lambda_1, \lambda_2)$. For Z1 having pattern phase 0° the sequence $(\lambda_1, \lambda_2)$ may be synchronized with the sequence $(P_1, P_2)$. The combination of matched sequences may conveniently be denoted by a form [Z1: $(\lambda_1, \lambda_2)$; $(P_1, P_2)$]. Inserting values for the perturbation phase shifts and optical pattern modulators, the matched sequences become [Z1: (0°, 180°); (1, 0)]. For Z2 having pattern phase 180°, the sequence $(\lambda_1, \lambda_2)$ may be synchronized with the reversed sequence, $(P_2, P_1)$, of optical pattern modifiers so that [Z2: $(\lambda_1, \lambda_2)$; $(P_2, P_1)$] and [Z2: (0°, 180°); (0,1)].

For a pixel p(i,j) imaging a feature f(i,j) that is located in an illumination zone type Z1, expression (28) may be evaluated for the matched sequences [Z1: (0°, 180°); (1,0)] to provide a voltage $V_k(i,j,\varphi_d(i,j),\psi_k,Z1)$ that CW-TOF camera 200 provides for f(i,j) and sampling phase offset $\psi_k$, $$V_k(i, j, \varphi_d(i, j), \psi_k, Z1) = \quad (37)$$
$$C_D(i,j) + 2C_{mp}(i,j) + 1 \cdot B(i,j)\cos(\psi_k + 0° + \varphi_d(i,j)) +$$
$$0 \cdot B(i,j)\cos(\psi_k + 180° + \varphi_d(i,j)) =$$
$$C_D(i,j) + 2C_{mp}(i,j) + B(i,j)\cos(\psi_k + \varphi_d(i,j)).$$

In the expression Z1 is added to the argument of voltage $V_k(i,j,\varphi_d(i,j),\psi_k,Z1)$ to explicitly indicate that the voltage is for a feature f(i,j) in zone Z1. Similarly, for a pixel p(i,j) imaging a feature f(i,j) located in an illumination zone type Z2, matched sequences [Z2: (0°, 180°); (0,1)] result in, $$V_k(i, j, \varphi_d(i, j), \psi_k, Z2) = \quad (38)$$
$$C_D(i,j) + 2C_{mp}(i,j) + 0 \cdot B(i,j)\cos(\psi_k + 0° + \varphi_d(i,j)) +$$
$$1 \cdot B(i,j)\cos(\psi_k + 180° + \varphi_d(i,j)) =$$
$$C_D(i,j) + 2C_{mp}(i,j) - B(i,j)\cos(\psi_k + \varphi_d(i,j)).$$

It is noted that in the above evaluations in expression (31) and (32) pattern phases 0° and 180° do not explicitly appear because they are accounted for by the reverse orderings, $(P_1, P_2)$ and $(P_2, P_1)$, of optical pattern modifiers synchronized with the same sequence of perturbation phase shifts (0°, 180°) for illumination zones Z1 and Z2 respectively and reversal of sign before the last term in the expressions. Voltages provided by pixels in different illumination zones, following summation over perturbation phases may generically be referred to by $V_k(i,j,\varphi_d(i,j),\psi_k)$.

From expressions (31) and (32) it is seen that CW-TOF camera 200 using the matched sequences of perturbation phase shifts and optical pattern modifiers for Z1 and Z2 provides a voltage $V_k(i,j,\varphi_d(i,j),\psi_k)$ for a feature $f(i,j)$ and sampling phase offset $\psi_k$ having a same form of dependence on the sampling phase offset and propagation phase delay $\varphi_d(i,j)$ as shown in expression (10). Furthermore, MPI only contributes to constant terms $NC_{mp}(i,j)$ in expressions (31) and (32). Since as noted above, constants in expression (10) do not contribute to propagation phase delay $\varphi_d(i,j)$ determined in accordance with expression (11), voltages $V_k(i,j,\varphi_d(i,j),\psi_k)$ provided by CW-TOF camera 200 provide propagation phase delays $\varphi_d(i,j)$ and therefrom corresponding distances $d(i,j)$ to features $f(i,j)$ in scene 30 that are substantially free of error generated by MPI.

In an embodiment, an AMPI set may comprise N=3 perturbation phase shifts $\lambda_n$ having respective values 0°, 120°, and 240°, three binary optical pattern modifiers $P_1=1$, $P_2=0$, $P_3=0$, and three types of illumination zones Z1, Z2, and Z3 having respective pattern phases 0°, 120°, and 240°. The illumination zones may be defined by [Z1: (0°, 120°, 240°); (1, 0, 0)], [Z2: (0°, 120°, 240°); (0, 1, 0)], [Z3: (0°, 120°, 240°); (0, 0, 1)]. Similarly to evaluating expression (28) for zones Z1 and Z2 above, evaluating expression (28) for voltages provided by CW-TOF camera 200 for features $f(i,j)$ in the three zones with $C(i,j)=C_D(i,j)+NC_{mp}(i,j)$ provides:

$$V_k(i,j,\psi_k,Z1)=C(i,j)+1\cdot B(i,j)\cos(\psi_k+0°+\varphi_d(i,j))+0\cdot B(i,j)\cos(\psi_k+120°+\varphi_d(i,j))+0\cdot B(i,j)\cos(\psi_k+240°+\varphi_d(i,j))=C(i,j)+B(i,j)\cos(\psi_k+\varphi_d(i,j)) \quad (39)$$

$$V_k(i,j,\psi_k,Z2)=C(i,j)+0\cdot B(i,j)\cos(\psi_k+0°+\varphi_d(i,j))+1\cdot B(i,j)\cos(\psi_k+120°+\varphi_d(i,j))+0\cdot B(i,j)\cos(\psi_k+240°+\varphi_d(i,j))=C(i,j)+B(i,j)\cos(\psi_k+\varphi_d(i,j)+120°). \quad (40)$$

$$V_k(i,j,\psi_k,Z3)=C(i,j)+1\cdot B(i,j)\cos(\psi_k+0°+\varphi_d(i,j))+0\cdot B(i,j)\cos(\psi_k+120°+\varphi_d(i,j))+(0\cdot B(i,j)\cos(\psi_k+240°+\varphi_d(i,j))=C(i,j)+B(i,j)\cos(\psi_k+\varphi_d(i,j))+240°). \quad (41)$$

Evaluating expression (28) in accordance with an embodiment for an N=4 perturbation phase AMPI sets having four binary pattern modifiers, and four illumination zones Z1, . . . Z4 for which [Z1: (0°, 90°, 180°, 270°); (1, 0, 0,1)], [Z2: (0°, 90°, 180°, 270°); (1, 1, 0,0)], [Z3: (0°, 90°, 180°, 270°); (0, 1, 1,0)], [Z4: (0°, 90°, 180°, 270°); (0, 0, 1,1)], and having pattern phases that are plus or minus 45° provides $$V_k(i,j,\psi_k,Z1)=C(i,j)+\sqrt{2}B(i,j)\cos(\psi_k+\varphi_d(i,j)-45°),$$

$$V_k(i,j,\psi_k,Z2)=C(i,j)+\sqrt{2}B(i,j)\cos(\psi_k+\varphi_d(i,j)+45°),$$

$$V_k(i,j,\psi_k,Z3)=C(i,j)-\sqrt{2}B(i,j)\cos(\psi_k\pm\varphi_d(i,j)-45°), \text{ and}$$

$$V_k(i,j,\psi_k,Z4)=C(i,j)-\sqrt{2}B(i,j)\cos(\psi_k+\varphi_d(i,j)+45°). \quad (42)$$

An AMPI set in accordance with an embodiment may have N=2 perturbation phases and two illumination zones having respective pattern phases 0°, 180°, and defined by [Z1: (0°, 180°); (1, 0.5-E)] and [Z2: (0°, 180°); (0, 0.5+E)], where 0.5 is a DC level and E<0.5. The AMPI sets provide $$V_k(i,j,\psi_k,Z1)=C(i,j)+(0.5+E)B(i,j)\cos(\psi_k+\varphi_d(i,j)), \text{ and}$$

$$V_k(i,j,\psi_k,Z2)=C(i,j)-(0.5+E)B(i,j)\cos(\psi_k+\varphi_d(i,j)). \quad (43)$$

An AMPI set in accordance with an embodiment may have N>2 perturbation phases $\lambda_n=(n-1)360°/N$, (0≤n≤N) and two illumination zones having respective pattern phases 0°, 180°, and defined by

[Z1: $(\lambda_1,\lambda_2, \ldots \lambda_N)$; (1+cos $\lambda_1$,1+cos $\lambda_2$, . . . , 1+cos $\lambda_N$)] and

[Z2: $(\lambda_1,\lambda_2, \ldots \lambda_N)$; (1−cos $\lambda_1$,1−cos $\lambda_2$, . . . , 1−cos $\lambda_N$)]. The AMPI sets provide, $$V_k(i,j,\psi_k,Z1)=C(i,j)+(N/2)B(i,j)\cos(\psi_k+\varphi_d(i,j)), \text{ and}$$

$$V_k(i,j,\psi_k,Z2)=C(i,j)-(N/2)B(i,j)\cos(\psi_k+\varphi_d(i,j)) \quad (44)$$

An AMPI set in accordance with an embodiment may have N=2 perturbation phases, 0°, 180° sinusoidal optical pattern modifiers $P_n$, and two illumination zones having a difference in pattern phase $\xi(i,j)$ and defined by,

[Z1: (0°,180°); (1+k cos(0°+$\xi(i,j)$)),(1+k cos(180°+$\xi(i,j)$))], and

[Z2: (0°,180°); (1+k cos(180+$\xi(i,j)$)),(1+k cos(0°+$\xi(i,j)$))]

The AMPI sets provide $$V_k(i,j,\psi_k,Z1)=C(i,j)+2kB(i,j)\cos(\xi_L)\cos(\psi_k+\varphi_d(i,j)), \text{ and}$$

$$V_k(i,j,\psi_k,Z2)=C(i,j)-2kB(i,j)\cos(\xi_L)\cos(\psi_k+\varphi_d(i,j)) \quad (45)$$

An AMPI set in accordance with an embodiment may have N>2 perturbation phases $\lambda_n=(n-1)360°/N$, (0≤n≤N), N sinusoidal optical pattern modifiers $P_n$, and a pattern phase $\xi(i,j)$ which is a continuous function of location in scene 30 that defines a structured illumination pattern for which illumination of features $f(i,j)$ in the scene changes continuously as a function of location of the features. For example, $\xi(i,j)$ may be a continuous function of one of index i, and index j, with at any given time, features $f(i,j)$ imaged on a pixel $p(i,j)$ in a same row or column in photosensor 22 having a same intensity of illumination, and features in adjacent rows or columns having different intensities of illumination so that illumination of scene 30 appears to have a one dimensional gradient. Optionally, the gradient is a two dimensional gradient generated by a pattern phase $\xi(i,j)$ that is a continuous function of both indices i and j. Each value of pattern phase $(i,j)$ may be considered to define an illumination zone. By way of example optical pattern modifiers may be harmonic function optionally defining an AMPI set of a form

[$(\lambda_1,\lambda_2, \ldots \lambda_N)$); (1+k cos($\lambda_1$+$\xi(i,j)$)),(1+k cos($\lambda_2$+$\xi(i,j)$)), . . . , (1+k cos($\lambda_N$+$\xi(i,j)$))], For each feature $f(i,j)$ imaged on a pixel 23 $p(i,j)$ the AMPI set provides a voltage $V_k(i,j,\varphi_d(i,j),\psi_k)$ relatively free of MPI given by an expression, $$V_k(i,j,\varphi_d(i,j),\psi_k)=C(i,j)+(N/2)kB(i,j)\cos(\psi_k+\varphi_d(i,j)+\xi(i,j)), \quad (46)$$

Similarly, an AMPI set in accordance with an embodiment may have N>2 perturbation phases $\lambda_n=(n-1)360°/N$, (0≤n≤N), N sinusoidal optical pattern modifiers $P_n$ and continuous illumination zones defined by

[$(\lambda_1,\lambda_2, \ldots \lambda_N)$); (1+cos $\lambda_1$ cos $\xi_L$),(1+cos $\lambda_2$ cos $\xi_L$), . . . , (1+cos $\lambda_N$ cos $\xi_L$)] and That provides for a feature $f(i,j)$ $$V_k(i,j,\varphi_d(i,j),\psi_k)=C(i,j)+(N/2)B(i,j)\cos \xi_L \cos(\psi_k+\varphi_d(i,j)). \quad (47)$$

It is noted that in the above discussion and examples, structured light 400 and structural illumination patterns of scene 30 that the structured light generates were assumed to be dynamic in the sense that they changed as a function of time in synchrony with time dependent changes in perturbation phase shifts $\lambda_n$. And examples of embodiments indicated that voltages $V_k(i,j,\varphi_d(i,j),\psi_k)$ for a given sampling phase offset $\psi_k$ and associated sequence of perturbation phase shifts $\lambda_n$ was assumed acquired in a single exposure period $Ex_k$ and single frame of photosensor 22. However, practice of embodiments of the disclosure is not limited to single exposure periods and/or single frame acquisitions and/or dynamic spatial illumination patterns. Voltages to be summed over perturbation phase shifts to provide voltage $V_k(i,j,\varphi_d(i,j),\psi_k)$ may be acquired in a plurality of frames of photosensor 22 and structured light and corresponding structured illumination patterns may be stationary and substantially independent of perturbation phase shifts $\lambda_n$, in accordance with an embodiment of the disclosure. Structured light may be considered stationary if amplitude and frequency of modulation of light intensity illuminating a given region of a scene during an exposure period of photosensor 22 to acquire an image of a scene imaged by CW-TOF camera 200 are substantially constant and the same for images that the camera acquires for a same range image of the scene. Modulation amplitudes of light illuminating a same region of the scene at different sampling phase offsets may be considered to be the same if they may be normalized to a same amplitude. Hereinafter, for convenience of presentation, it is assumed that same amplitudes are equal.

For example, to provide voltages $V_k(i,j,\varphi_d(i,j),\psi_k)$ from which to determine distances to features $f(i,j)$ in scene 30, controller 225 may control CW-TOF camera 200 to acquire a different frame of voltages for pixels $p(i,j)$ in photosensor 22 for each pairing of a sampling phase offset $\psi_k$ with a perturbation phase $\lambda_n$ and the optical pattern modifier $P_z(i,j,n)$ associated with the perturbation phase.

Let a voltage provided by a pixel $p(i,j)$ in a frame of voltages of photosensor 22 acquired for an exposure period, represented by $Ex_{k,n}$, for which sampling phase offset $\psi_k$ and perturbation phase $\lambda_n$ are constant during the exposure period be represented by $V_{k,n}(i,j,\varphi_d(i,j),\psi_k,\lambda_n,P_{z(i,j,n)})$. Then, similarly to expression (28), with $C(i,j,n)=C_D(i,j,n)+C_{mp}(i,j)$, $$V_{k,n}(i,j,\varphi_d(i,j),\psi_k,\lambda_n,P_{z(i,j,n)})=C(i,j,n)+P_{z(i,j,n)}B(i,j)\cos(\psi_k+\lambda_n+\varphi_d(i,j)), \quad (48)$$

and a voltage $V_k(i,j,\varphi_d(i,j),\psi_k)$ for use in calculating propagation phase delay $\varphi_d(i,j)$ may be determined in accordance with an expression, $$V_k(i,j,\varphi_d(i,j),\psi_k)=\Sigma_n V_{k,n}(i,j,\varphi_d(i,j),\psi_k,\lambda_n,P_{z(i,j,n)}). \quad (49)$$

Furthermore, as noted above, whereas discussion of embodiments assumed that for a given pixel $p(i,j)$ illumination of a feature $f(i,j)$ imaged on the pixel is dynamic and changes in synchrony with changes in perturbation phase $\lambda_n$, practice of embodiments of the disclosure is not limited to dynamic structured illumination patterns. For dynamic structured illumination patterns change in illumination with change in $\lambda_n$ is expressed by dependence on index n of the optical pattern modifier $P_{z(i,j,n)}$ that characterizes illumination of an illumination zone in which feature $f(i,j)$ of scene 30 is located. In an embodiment, structured light that illuminates a scene and a structured illumination pattern comprising illumination zones that it generates in the scene, such as scene 30, in accordance with an embodiment, may be stationary, do not change with change in $\lambda_n$, and are substantially independent of index n.

Assume that controller 225 operates CW-TOF camera 200 to illuminate scene 30 with a stationary illumination pattern to acquire a range image of the scene. A stationary illumination pattern comprises Z different types of stationary illumination zones, respectively characterized and represented by different optical pattern modifiers $ZP_z$ ($1 \leq z \leq Z$) that do not change with change in perturbation phase $\lambda_n$.

Assume further that controller 225 controls the camera in accordance with K sampling phase offsets $\psi_k$ ($1 \leq k \leq K | K \geq 3$), and N perturbation phases $\lambda_n$ ($1 \leq n \leq N | N \geq 2$). In an embodiment, controller 225 optionally controls CW-TOF camera 225 to acquire a plurality of frames of photosensor 22 that image scene 30 sufficient in number to provide approximations to voltages $V_{k,n}(i,j,\varphi_d(i,j),\psi_k,\lambda_n,P_{z(i,j,n)})$ for a pixel $p(i,j)$ that may be processed to determine a distance to features $f(i,j)$.

Under the assumption of K sampling phase offsets $\psi_k$ and N perturbation phases $\lambda_n$, as indicated by expression (49), the acquired data must be sufficient to provide K×N voltages $V_{k,n}(i,j,\varphi_d(i,j),\psi_k,\lambda_n,P_{z(i,j,n)})$ for a pixel $p(i,j)$ to determine a distance to the feature $f(i,j)$ that the pixel images. Whereas, CW-TOF camera 200 might be operated to acquire K×N frames of photosensor 22 to provide the K×N voltages, because a frame acquired for $(\psi_k+\lambda_n)$ provides the same voltages as a frame acquired for $(\psi_{k'}+\lambda_{n'})$ if $(\psi_k+\lambda_n)=(\psi_{k'}+\lambda_{n'})$, a number of frames less than K×N may be sufficient to provide the voltages. For example, for choices of K and N for which N=mK where m is an integer, a plurality of N frames instead of $mK^2$ frames is sufficient to provide the voltages. By way of a numerical example, for m=1, N=K=3 a plurality of N=3 frames rather than 9 frames is sufficient to provide the voltages. On the other hand, if N≠mK, generally K×N frames are advantageous for providing the voltages.

In the following discussion a stationary illumination zone $ZP_z$ in which a feature $f(i,j)$ is located is represented by $ZP_{z(i,j)}$. A voltage for feature $f(i,j)$ in illumination zone $ZP_{z(i,j)}$ that pixel $p(i,j)$ provides for a given $\psi_k$ and a given $\lambda_n$, is denoted $V_{k,n}(i,j,\varphi_d(i,j),\psi_k,\lambda_n,ZP_{z(i,j)})$ and may be expressed, $$V_{k,n}(i,j,\varphi_d(i,j),\psi_k,\lambda_n,ZP_{z(i,j)})=C(i,j)+ZP_{z(i,j)}B(i,j)\cos(\psi_k+\lambda_n+\varphi_d(i,j)). \quad (50)$$

Voltages $V_{k,n}(i,j,\varphi_d(i,j),\psi_k,\lambda_n,ZP_{z(i,j)})$ may be provided by a plurality of K×N frames acquired during K×N respective exposure periods $Ex_{k,n}$, or a plurality of less than K×N frames and exposure periods as discussed above.

Were controller 225 to determine a voltage $V_k(i,j,\varphi_d(i,j),\psi_k)$ for feature $f(i,j)$ from which to determine $\varphi_d(i,j)$ by simply implementing expression (49) and summing over n voltages $V_{k,n}(i,j,\varphi_d(i,j),\psi_k,\lambda_n,ZP_{z(i,j)})$ provided by pixel $p(i,j)$ for feature $f(i,j)$, the determined voltage would be equal to a same constant for each $\psi_k$ because for a stationary illumination pattern $ZP_{z(i,j)}B(i,j)$ is independent of n. In symbols, $$V_k(i, j, \varphi_d(i, j), \psi_k) = \Sigma_n V_{k,n}(i, j, \varphi_d(i, j), \psi_k, \lambda_n, ZP_{z(i,j)}) = \quad (51)$$
$$\Sigma_n[C(i, j) + ZP_{z(i,j)}B(i, j)\cos(\psi_k + \lambda_n + \varphi_d(i, j))] = NC(i, j).$$

As a result, the determined voltage would not in general be useable to determine $\varphi_d(i,j)$.

In an embodiment, to calculate a sum over $\lambda_n$ that provides a value for $V_k(i,j,\varphi_d(i,j),\psi_k)$ that is dependent on $\psi_k$ and useable to determine distance for feature $f(i,j)$, controller 225 uses at least one voltage provided by a pixel $p(i',j')$ imaging a feature $f(i',j')$ located in a type of stationary illumination zone $ZP_{z(i',j')}$ that is different from that of the stationary illumination zone $ZP_{z(i,j)}$ in which feature $f(i,j)$ imaged by pixel $p(i,j)$ is located. The stationary illumination zone $ZP_{z(i,j)}$ in which feature $f(i,j)$ is located may be considered a "home" illumination zone and the other at least one illumination zone $ZP_{z(i',j')}$ may be considered a "surrogate"

illumination zone. The controller pairs the at least one surrogate stationary illumination zone $ZP_{z(i',j')}$ with a perturbation phase $\lambda_n$ different from a perturbation phase for which pixel p(i,j) provides a voltage. Pixel p(i',j') therefore contributes a voltage to the sum for an optical pattern modifier and a perturbation phase $\lambda_n$ that are different from that for which pixel p(i,j) provides a voltage for the sum.

The voltage provided by pixel p(i',j') is an approximation to a voltage that pixel p(i,j) would provide for the perturbation phase and optical pattern modifier for which pixel p(i',j') provides voltage, were pixel p(i,j) located in a suitable dynamic illumination zone for which illumination changes with change in perturbation phase. Advantageously, each of the at least one surrogate illumination zone is a nearest neighbor to the home illumination zone of a type different from the type of the home illumination zone. And for a given surrogate illumination zone, pixel p(i',j') in the surrogate illumination zone is advantageously a nearest neighbor pixel in the given surrogate illumination zone to pixel p(i,j).

The use of surrogate illumination zones paired with perturbation phases, in accordance with an embodiment of the disclosure, provides the variation of optical pattern modifier with perturbation phase in a sum over $\lambda_n$ that the home illumination zone, because it is stationary, cannot provide. The use of the surrogate illumination zones therefore results in an advantageous value for $V_k(i,j,\varphi_d(i,j),\psi_k)$, that is usable to determine propagation phase delay $\varphi_d(i,j)$ for pixel p(i,j) and therefore a distance to feature f(i,j).

Let a voltage provided by a pixel p(i,j) associated a stationary illumination zone $ZP_{z(i,j)}$ that controller 225 pairs with a perturbation phase $\lambda_n$ be represented by $V_{k,z}(i,j,\psi_k,\lambda_n,ZP_{z(i,j,n)},\varphi_d(i,j))$, where "n" in the index z of $ZP_{z(i,j,n)}$ indicates pairing of stationary illumination zone $ZP_{z(i,j)}$ with perturbation phase $\lambda_n$. A sum using surrogate illumination zones to determine voltage $V_k(i,j,\varphi_d(i,j),\psi_k)$ for a pixel p(i,j) in accordance with an embodiment of the disclosure may be expressed as:

$$V_k(i,j,\psi_k,\varphi_d(i,j)) \approx V_{k,z}(i,j,\psi_k,\lambda_n,ZP_{z(i,j,n)},\varphi_d(i,j)) + \Sigma_{n' \neq n} V_{k,z}(i',j',\psi_k,\lambda_{n'},ZP_{z'(i',j',n')},\varphi_d(i',j')). \quad (52)$$

In expression (52), the first term is a voltage that pixel p(i,j) provides responsive to light from feature f(i,j) in its home illumination zone $ZP_{z(i,j,n)}$ that the pixel registers for $\psi_k$ and a particular perturbation phase, $\lambda_n$, of N perturbation phases that controller 225 pairs with the home illumination zone $ZP_{z(i,j,n)}$. The second term in expression (52) is a summation of voltages $V_{k,z'}(i',j',\psi_k,\lambda_{n'},ZP_{z'}(i',j',n'),\varphi_d(i',j'))$ over perturbation index n' for n'≠n, where n is the index of perturbation phase $\lambda_n$ paired with the home illumination zone in the first term, and (i',j') are coordinates of a pixel p(i',j') as discussed below. Voltage $V_{k,z'}(i',j',\psi_k,\lambda_{n'},ZP_{z'}(i',j',n'),\varphi_d(i',j'))$ is provided by a pixel p(i',j') responsive to light from a feature f(i',j') located in the stationary illumination zone, $ZP_{z'(i',j',n')}$. As noted above p(i',j') may advantageously be a suitable nearest neighbor of pixel p(i,j), and as a result propagation phase delay $\varphi_d(i',j')$ is expected to be approximately equal to $\varphi_d(i,j)$ and limited in contributing error to distance that CW-TOF camera 200 determines for feature f(i,j) imaged on pixel p(i,j).

It is noted that in general, the stationary illumination zone, $ZP_{z(i',j',n')}$, indicated by index n' is a surrogate illumination zone. However, in accordance with an embodiment of the disclosure controller 225 may pair perturbation phases to stationary illumination zones by bijective or surjective mapping to provide $V_k(i,j,\psi_k,\varphi_d(i,j))$ in expression (52). For surjective mapping the controller may pair more than one perturbation phase to a same stationary illumination zone.

As a result, an illumination zone $ZP_{z(i',j',n')}$ in the second term of expression (52) may be the home illumination zone, in which case indices (i',j') would advantageously be equal respectively to (i,j).

By way of example, assume that CW-TOF camera 200 illuminates a scene, such as scene 30 with a stationary illumination pattern having Z different stationary illumination zones $ZP_z$ to image the scene for K sampling phases $\psi_k$ and N perturbation phases $\lambda_n$. Assuming that Z=N controller 225 might pair perturbation phases with stationary illumination zones with a bijective mapping to provide the following set of pairings for use in expression (52)

$$(\lambda_1,ZP_1,\psi_k),(\lambda_2,ZP_2,\psi_k),(\lambda_3,ZP_3,\psi_k),(\lambda_4,ZP_4,\psi_k),\ldots(\lambda_N,ZP_N,\psi_k). \quad (53)$$

For a pixel p(i,j) optionally located in stationary illumination zone $ZP_1$, the first term in expression (52) for $V_k(i,j,\psi_k,\varphi_d(i,j))$ becomes $$V_{k,z}(i,j,\psi_k,\lambda_n,ZP_{z(i,j,n)},\varphi_d(i,j))=V_{k,1}(i,j,\psi_k,\lambda_1,ZP_{1(i,j)},\varphi_d(i,j)), \quad (54)$$

and the summation in expression (52) becomes $$\Sigma_{n' \neq n} V_{k,z'}(i',j',\psi_k,\lambda_{n'},ZP_{z'(i',j',n')},\varphi_d(i',j'))=V_{k,2}(i',j',\psi_k,\lambda_2,ZP_{2(i',j')},\varphi_d(i',j'))+V_{k,3}(i',j',\psi_k,\lambda_3,ZP_{3(i',j')},\varphi_d(i',j'))+\ldots V_{k,N}(i',j',\psi_k,\lambda_N,ZP_{N(i',j')},\varphi_d(i',j')). \quad (55)$$

Where as noted above (i',j') are coordinates of a pixel p(i',j'), which optionally is a suitable nearest neighbor of pixel p(i,j).

By way of a specific numerical example, assume that K=Z=N=3 so that the sampling phase offsets $\psi_1$, $\psi_2$, and $\psi_3$, assume values 0°, 120°, 240° respectively, the perturbation phases $\lambda_1$, $\lambda_2$, and $\lambda_3$, also assume values 0°, 120°, 240°, and the stationary illumination zones may be represented by, and optionally have optical pattern modifiers $ZP_1=1.5$, $ZP_2=1.0$, and $ZP_3=0.5$. Controller 225 may use the following bijective mapping of $\lambda_n$ to $ZP_z$ acquire a range image of scene 30 for a sampling phase offset $\psi_k$:

$$(\lambda_1=0° \to ZP_1=1.5,\psi_k),(\lambda_2=120° \to ZP_2=1.0,\psi_k),(\lambda_3=240° \to ZP_3=0.5,\psi_k). \quad (56)$$

And for $\psi_1$, $\psi_2$, and $\psi_3$, having, respective values 0°, 120°, 240° noted above, expression (56) becomes respectively, $$\left.\begin{array}{c}(0°, ZP_1 = 1.5, 0°), (120°, ZP_2 = 1.0, 0°), (240°, ZP_3 = 0.5, 0°),\\ (0°, ZP_1 = 1.5, 120°), (120°, ZP_2 = 1.0, 120°),\\ (240°, ZP_3 = 0.5, 120°), \text{ and}\\ (0°, ZP_1 = 1.5, 240°), (120°, ZP_2 = 1.0, 240°), (240°, ZP_3 = 0.5, 240°).\end{array}\right\} \quad (57)$$

By way of a numerical example of a surjective mapping, assume that K=N=3 and that the stationary illumination pattern is similar to that shown in FIG. 2 having Z=2 interleaved dark and bright stationary illumination zones. Optionally the dark and bright illumination zones are characterized by optical pattern modifiers $ZP_1=0.5$ and $ZP_2=1.0$. Controller 225 may use the following surjective mapping of $\lambda_n$ to $ZP_z$ to acquire a range image of scene 30:

(0°, $ZP_1$=0.5, $\psi_k$), (120°, $ZP_2$=1.0,$\psi_k$), (240°, $ZP_2$=1.0, $\psi_k$). By way of a further numerical example for N=3, K=2 with $ZP_1$=1.5 and $ZP_2$=1.0, we have:

$$(0°,ZP_1=1.5,\psi_1=0°),(180°,ZP_2=1.0,\psi_1=0°),$$

$$(0°,ZP_1=1.5,\psi_2=120°),(180°,ZP_2=1.0,\psi_2=120°),$$

$$(0°,ZP_1=1.5,\psi_3=240°),(180°,ZP_2=1.0,\psi_3=240°),$$

where 0°/180° corresponding to a +/− sign operation or differential operation. In an embodiment two or more sets of optical pattern modifiers may be used in operations similar to those shown above to reduce error. For example using two sets of optical pattern modifiers (ZP1=1.5, ZP2=1.0) and (ZP1'=0.5, ZP2'=0.1) we have:

$$(0°,ZP_1=1.5,0°),(180°,ZP_2=0.5,0°),(0°,ZP_{1'}=1,0°),\\(180°,ZP_{2'}=0.1,0°),$$

$$(0°,ZP_1=1.5,120°),(180°,ZP_2=0.5,120°),(0°,ZP_{1'}=1,\\120°),(180°,ZP_{2'}=0.1,120°),$$

$$(0°,ZP_1=1.5,240°),(180°,ZP_2=0.5,240°),(0°,ZP_{1'}=1,\\240°),(180°,ZP_{2'}=0.1,240°).$$

It is noted that in the above mappings each of the various combinations of $\psi_k$ and $\lambda_n$ sum modulo 360° to only one of three sums 0°, 120°, 240°. Therefore all voltages in expression (52) for the above mapping examples may be acquired by CW-TOF camera 200 from three images of scene 30 acquired with respective phase offsets of 0°, 120°, and 240°, rather than from nine images of the scene.

It is also noted that whereas CW-TOF camera 200 comprises a controller 225 operable to control optical pattern generator 28 (FIG. 2) to synchronize optical pattern modifiers with changes in perturbation phase, a CW-TOF camera in accordance with an embodiment of the disclosure that acquires range images with stationary illumination patterns does not require such control of a pattern generator. A CW-TOF stationary illumination pattern camera in its simplest configuration that uses stationary illumination patterns to image scene may be absent any apparatus for controlling light source beyond apparatus for generating at least one stationary illumination pattern on scenes that the camera images.

There is therefore provided in accordance with an embodiment of the disclosure a continuous wave time of flight (CW-TOF) camera operable to determine distances to features in a scene, the CW-TOF camera comprising: a light source operable to transmit light to illuminate the scene; a photosensor having a plurality of pixels configured to register amounts of light reflected from the transmitted light by features in the scene; and a controller configured to: control the light source to transmit structured light modulated at a modulation frequency to illuminate the scene with a structured illumination pattern; and for each combination of a sampling phase offset $\psi_k=2\pi(k-1)/K$ ($1\leq k\leq K$) of a plurality of $K\leq 3$ different sampling phase offsets and a perturbation phase shift $\lambda_n=2\pi(n-1)/N$ ($1\leq n\leq N$) of a plurality of $N\geq 2$ different perturbation phase shifts: modulate sensitivity of the photosensor at the frequency of modulation of the transmitted light but phase shifted relative to phase of the transmitted light by a phase $\theta_{k,n}=(\psi_k+\lambda_n)$; for each value of $\theta_{k,n}$ modulo 360°, turn on the photosensor for a different exposure period to register light reflected by the features; and determine distances to the features based on the light registered by the pixels.

Optionally turning on the photosensor for a different exposure period for each value of $\theta_{k,n}$ modulo 360° comprises for each sampling phase offset $\psi_k$ turning on the photosensor for a different exposure period, $Ex_{k,n}$, for each $\lambda_n$ of the N different perturbation phase shifts. Optionally the controller is configured to control the light source to modify the structured light with a sequence of optical pattern modifiers in synchrony with the sequence of perturbation phase shifts.

In an embodiment determining a distance to a feature f(i,j) imaged on a pixel p(i,j) of the photosensor designated by indices (i,j) comprises summing voltages representing light that the pixel registers during each of the exposure periods $Ex_{k,n}$ to provide a voltage $V_k(i,j,\varphi_d(i,j),\psi_k)$, where $\varphi_d(i,j)$ represents a propagation phase delay for light to travel from the camera to the feature and back to the camera. Optionally determining distance to the feature comprises using the voltages $V_k(i,j,\varphi_d(i,j),\psi_k)$ to determine $\varphi_d(i,j)$ and therefrom the distance.

In an embodiment determining the structured illumination pattern is a stationary illumination pattern comprising a plurality of Z different types of stationary illumination zones $ZP_z$, ($1\leq z\leq Z$). Optionally turning on the photosensor for a different exposure period for each value of $\theta_{k,n}$ modulo 360° comprises for each sampling phase offset $\psi_k$ turning on the photosensor for a different exposure period, $Ex_{k,n}$, for each $\lambda_n$ of the N different perturbation phase shifts. Turning on the photosensor for a different exposure period for each value of $\theta_{k,n}$ modulo 360° may comprise turning on the photosensor for a number of exposure periods less than K×N. Optionally the number of exposure periods less than K×N is equal to the number of different values of $\theta_{k,n}$ modulo 360°.

In an embodiment determining a distance to a feature f(i,j) located in a stationary illumination zone $ZP_{z(i,j)}$ imaged on a pixel p(i,j) comprises determining for each $\psi_k$ a sum of a plurality of voltages each voltage representing light registered by a pixel in the photosensor for a different perturbation phase $\lambda_n$. Optionally, the plurality of voltages comprises a voltage representing light registered by the pixel p(i,j) for a first perturbation phase $\lambda_n$ and a voltage representing light registered by a pixel p(i',j') from a feature f(i',j') located in type of stationary illumination zone $ZP_{z(i',j')}$ different from the type of stationary illumination zone $ZP_{z(i,j)}$ in which f(i,j) is located for a second perturbation phase $\lambda_n$ different from the first perturbation phase. Optionally the sum of voltages comprises a voltage for each $\lambda_n$ paired with a stationary illumination zone $ZP_z$ provided by a pixel that images a feature located in the stationary illumination zone. The number Z of different stationary illumination zones $ZP_z$ may be equal to the number N of perturbation phases $\lambda_n$ and the controller pairs the perturbation phases with stationary illumination zones using a bijective mapping of the perturbation phases to the stationary illumination zones. Optionally number Z of different stationary illumination zones $ZP_z$ is less than the number N of perturbation phases $\lambda_n$ and the controller pairs the perturbation phases with stationary illumination zones using a surjective mapping of the perturbation phases to the stationary illumination zones.

There is further provided in accordance with an embodiment of the disclosure, a method of determining distances to features in a scene, the method comprising: transmitting structured light modulated at a modulation frequency to illuminate a scene with a structured illumination pattern; and for each combination of a sampling phase offset $\psi_k=2\pi(k-1)/K$ ($1\leq k\leq K$) of a plurality of $K\geq 3$ different sampling phase offsets and a perturbation phase shift $\lambda_n=2\pi(n-1)/N$ ($1\leq n\leq N$) of a plurality of $N\geq 2$ different perturbation phase shifts: modulating sensitivity of a photosensor having pixels configured to register light at the frequency of modulation of the transmitted light, but phase shifted relative to phase of the transmitted light by a phase $\theta_{k,n}=(\psi_k+\lambda_n)$; for each value of $\theta_{k,n}$ modulo 360°, turning on the photosensor for a different exposure period to register light reflected by features in the scene; and determining distances to the features based on the light registered by the pixels.

Optionally, turning on the photosensor for a different exposure period for each value of $\theta_{k,n}$ modulo 360° comprises for each sampling phase offset $\psi_k$ turning on the photosensor for a different exposure period, $Ex_{k,n}$, for each $\lambda_n$ of the N different perturbation phase shifts. Turning on the photosensor for a different exposure period for each value of $\theta_{k,n}$ modulo 360° may comprise turning on the photosensor for a number of exposure periods less than K×N. Optionally, the number of exposure periods less than K×N is equal to the number of different values of $\theta_{k,n}$ modulo 360°.

In an embodiment illuminating the scene with a structured illumination pattern comprises illuminating the scene with a stationary illumination pattern comprising a plurality of Z different types of stationary illumination zones $ZP_z$, ($1 \leq z \leq Z$).

In an embodiment illuminating the scene with a structured illumination pattern comprises illuminating the scene with a dynamic illumination pattern comprising a plurality of Z different types of dynamic illumination zones for each of which dynamic illumination zone, illumination is controllable to change as a function of time independently of illumination of the other zones.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. A continuous wave time of flight (CW-TOF) camera operable to determine distances to features in a scene, the CW-TOF camera comprising:
    a light source operable to transmit light to illuminate the scene;
    a photosensor having a plurality of pixels configured to register amounts of light reflected from the transmitted light by features in the scene; and
    a controller configured to:
        control the light source to transmit structured light modulated at a modulation frequency to illuminate the scene with a structured illumination pattern; and
        for each combination of a sampling phase offset of a plurality of different sampling phase offsets and a perturbation phase shift of a plurality of different perturbation phase shifts:
            modulate sensitivity of the photosensor at the frequency of modulation of the transmitted light but phase shifted relative to phase of the transmitted light by a phase equal to a sum of the sampling phase offset and the perturbation phase;
            for each value of the sum modulo 360°, turn on the photosensor for a different exposure period to register light reflected by the features; and
            determine distances to the features based on the light registered by the pixels.

2. The CW-TOF camera according to claim 1 wherein turning on the photosensor for a different exposure period comprises for each sampling phase offset turning on the photosensor for a different exposure period for each of the plurality of different perturbation phase shifts.

3. The CW-TOF camera according to claim 2 wherein the controller is configured to control the light source to modify the structured light with a sequence of optical pattern modifiers in synchrony with a sequence of the perturbation phase shifts.

4. The CW-TOF camera according to claim 3 wherein determining a distance to a feature imaged on a pixel of the photosensor comprises summing voltages representing light that the pixel registers during each of the exposure periods to provide a summed voltage that is a function of a propagation phase delay for light to travel from the camera to the feature and back to the camera.

5. The CW-TOF camera according to claim 4 wherein determining distance to the feature comprises using the summed voltages to determine the propagation phase delay and therefrom the distance.

6. The CW-TOF camera according to claim 1 wherein the structured illumination pattern is a stationary illumination pattern comprising a plurality of different types of stationary illumination zones.

7. The CW-TOF camera according to claim 6 wherein turning on the photosensor for a different exposure period for each value of the sum modulo 360° comprises for each sampling phase offset turning on the photosensor for a different exposure period, for each perturbation phase shift of the plurality of different perturbation phase shifts.

8. A continuous wave time of flight (CW-TOF) camera operable to determine distances to features in a scene, the CW-TOF camera comprising:
    a light source operable to transmit light to illuminate the scene;
    a photosensor having a plurality of pixels configured to register amounts of light reflected from the transmitted light by features in the scene; and
    a controller configured to:
        control the light source to transmit structured light modulated at a modulation frequency to illuminate the scene with a structured illumination pattern; and
        for each combination of a sampling phase offset of a plurality of different sampling phase offsets and a perturbation phase shift of a plurality of different perturbation phase shifts:
            modulate sensitivity of the photosensor at the modulation frequency of the transmitted light but phase shifted relative to phase of the transmitted light by a phase equal to a sum of the sampling phase offset and the perturbation phase shift;
            for each value of a sum modulo 360°, turn on the photosensor for a different exposure period to register light reflected by the features, wherein turning on the photosensor for a different exposure period for each value of the sum modulo 360° comprises turning on the photosensor for a number of exposure periods less than a number of the plurality of sampling phases times the number of the plurality of perturbation phase shifts; and
            determine distances to the features based on the light registered by the pixels.

9. The CW-TOF camera according to claim 1 wherein turning on the photosensor for a different exposure period for each value of the sum modulo 360° comprises turning on the photosensor for a number of exposure periods that is equal to the number of different values of the sum modulo 360°.

10. The CW-TOF camera according to claim 6 wherein determining a distance to a feature located in a stationary illumination zone imaged on a given pixel comprises determining for each sampling phase offset a sum of a plurality of voltages each voltage representing light registered by a pixel in the photosensor for a different perturbation phase.

11. The CW-TOF camera according to claim 10 wherein the plurality of voltages comprises a voltage representing light registered by the given pixel for a first perturbation phase of the plurality of perturbation phases and a voltage representing light that a pixel registers from a feature located in type of stationary illumination zone different from the type of stationary illumination zone in which the feature imaged by the given pixel is located for a second perturbation phase $\lambda_n$ different from the first perturbation phase.

12. The CW-TOF camera according to claim 11 wherein the sum of voltages comprises a voltage for each perturbation phase paired with a stationary illumination zone provided by a pixel that images a feature located in the stationary illumination zone.

13. The CW-TOF camera according to claim 12 wherein a number of different stationary illumination zones is equal to a number of the plurality of perturbation phases and the controller pairs the perturbation phases with stationary illumination zones using a bijective mapping of the perturbation phases to the stationary illumination zones.

14. The CW-TOF camera according to claim 12 wherein a number of the plurality of different stationary illumination zones is less than a number of the plurality of perturbation phases, and the controller pairs the perturbation phases with stationary illumination zones using a surjective mapping of the perturbation phases to the stationary illumination zones.

15. A method of determining distances to features in a scene, the method comprising:
transmitting structured light modulated at a modulation frequency to illuminate a scene with a structured illumination pattern; and
for each combination of a sampling phase offset of a plurality of different sampling phase offsets and a perturbation phase shift of a plurality of different perturbation phase shifts:
modulating sensitivity of a photosensor having pixels configured to register light at the frequency of modulation of the transmitted light, but phase shifted relative to phase of the transmitted light by a phase equal to a sum of a sampling phase offset and a perturbation phase;
for each value of the sum modulo 360°, turning on the photosensor for a different exposure period to register light reflected by features in the scene; and
determining distances to the features based on the light registered by the pixels.

16. The method according to claim 15 wherein turning on the photosensor for a different exposure period for each value of the sum modulo 360° comprises for each sampling phase offset turning on the photosensor for a different exposure period for each perturbation phase of the plurality of different perturbation phase shifts.

17. The method according to claim 15 wherein turning on the photosensor for a different exposure period for each value of the sum modulo 360° comprises turning on the photosensor for a number of exposure periods less than a number of the plurality of sampling phases times the number of the plurality of perturbation phase shifts.

18. The method according to claim 15 wherein turning on the photosensor for a different exposure period for each value of the sum modulo 360° comprises turning on the photosensor for a number of exposure periods that is equal to the number of different values of the sum modulo 360°.

19. The method according to claim 15 wherein illuminating the scene with a structured illumination pattern comprises illuminating the scene with a stationary illumination pattern comprising a plurality of different types of stationary illumination zones.

20. The method according to claim 15 wherein illuminating the scene with a structured illumination pattern comprises illuminating the scene with a dynamic illumination pattern comprising a plurality of different types of dynamic illumination zones for each of which dynamic illumination zone, illumination is controllable to change as a function of time independently of illumination of the other zones.

* * * * *